United States Patent
Kitano et al.

(10) Patent No.: US 10,553,360 B2
(45) Date of Patent: *Feb. 4, 2020

(54) MULTILAYER CERAMIC CAPACITOR, MULTILAYER CERAMIC CAPACITOR SERIES INCLUDING THE SAME, AND MULTILAYER CERAMIC CAPACITOR MOUNT BODY INCLUDING THE SAME

(71) Applicant: Murata Manufacturing Co., Ltd., Nagaokakyo-shi, Kyoto-fu (JP)

(72) Inventors: Shota Kitano, Nagaokakyo (JP); Takanobu Katsuyama, Nagaokakyo (JP); Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,594

(22) Filed: Aug. 2, 2017

(65) Prior Publication Data

US 2017/0330687 A1 Nov. 16, 2017

Related U.S. Application Data

(63) Continuation of application No. 14/822,944, filed on Aug. 11, 2015, now Pat. No. 9,728,336.

(30) Foreign Application Priority Data

Aug. 13, 2014 (JP) .................................. 2014-164841

(51) Int. Cl.
*H01G 4/30* (2006.01)
*H01G 4/12* (2006.01)
(Continued)

(52) U.S. Cl.
CPC ............... *H01G 4/30* (2013.01); *H01G 4/012* (2013.01); *H01G 4/1209* (2013.01); *H01G 4/38* (2013.01); *H01G 4/12* (2013.01)

(58) Field of Classification Search
CPC ........ H01G 4/30; H01G 4/012; H01G 4/1209; H01G 4/38; H01G 4/12
See application file for complete search history.

(56) References Cited

U.S. PATENT DOCUMENTS

| 9,288,906 B2 * | 3/2016 | Lee | H05K 1/111 |
| 2004/0233612 A1 * | 11/2004 | Sugimoto | H01G 4/12 361/312 |

(Continued)

FOREIGN PATENT DOCUMENTS

JP 2014033097 A * 2/2014 ............... H01G 4/30

OTHER PUBLICATIONS

Kitano et al., "Multilayer Ceramic Capacitor, Multilayer Ceramic Capacitor Series Including the Same, and Multilayer Ceramic Capacitor Mount Body Including the Same", U.S. Appl. No. 14/822,944, filed Aug. 11, 2015.

(Continued)

*Primary Examiner* — David M Sinclair
(74) *Attorney, Agent, or Firm* — Keating & Bennett, LLP

(57) ABSTRACT

A body of a multilayer ceramic capacitor includes an inner layer portion and first and second outer layer portions sandwiching the inner layer portion therebetween. The inner layer portion includes an area extending from a conductive layer positioned closest to a first main surface to a conductive layer positioned closest to a second main surface in the stacking direction. The height of the body is smaller than the width of the body. The height of the inner layer portion is smaller than the width of the inner layer portion. The first outer layer portion includes a dielectric layer positioned (Continued)

closest to the first main surface. The second outer layer portion includes a dielectric layer positioned closest to the second main surface, and is thicker than the first outer layer portion. The total height of the first and second outer layer portions is smaller than the height of the inner layer portion.

15 Claims, 23 Drawing Sheets

(51) Int. Cl.
  *H01G 4/38* (2006.01)
  *H01G 4/012* (2006.01)

(56) References Cited

U.S. PATENT DOCUMENTS

| | | | | |
|---|---|---|---|---|
| 2010/0182733 A1* | 7/2010 | Suzuki | ............ | B32B 18/00 361/321.2 |
| 2012/0152604 A1* | 6/2012 | Ahn | ............ | H01G 2/065 174/260 |
| 2012/0300361 A1* | 11/2012 | Togashi | ............ | H01G 4/30 361/301.4 |
| 2013/0094121 A1* | 4/2013 | Endo | ............ | H01G 4/30 361/305 |
| 2013/0208402 A1* | 8/2013 | Hirata | ............ | H01G 4/30 361/321.4 |
| 2013/0222969 A1* | 8/2013 | Iguchi | ............ | C04B 35/495 361/301.4 |
| 2014/0020942 A1* | 1/2014 | Cho | ............ | H01G 4/30 174/260 |
| 2014/0083755 A1* | 3/2014 | Lee | ............ | H05K 1/181 174/260 |
| 2014/0166351 A1* | 6/2014 | Lee | ............ | H01G 2/06 174/258 |
| 2014/0185184 A1* | 7/2014 | Ahn | ............ | H01G 4/30 361/301.4 |
| 2014/0367152 A1* | 12/2014 | Lee | ............ | H05K 1/111 174/260 |
| 2015/0062775 A1* | 3/2015 | Shibasaki | ............ | H01G 4/30 361/301.4 |

OTHER PUBLICATIONS

Kitano et al., "Multilayer Ceramic Capacitor, Multilayer Ceramic Capacitor Series Including the Same, and Multilayer Ceramic Capacitor Mount Body Including the Same", U.S. Appl. No. 15/656,114, filed Jul. 21, 2017.

* cited by examiner

MULTILAYER CERAMIC CAPACITOR, MULTILAYER CERAMIC CAPACITOR SERIES INCLUDING THE SAME, AND MULTILAYER CERAMIC CAPACITOR MOUNT BODY INCLUDING THE SAME

BACKGROUND OF THE INVENTION

1. Field of the Invention

The present invention relates to a multilayer ceramic capacitor, a multilayer ceramic capacitor series including the same, and a multilayer ceramic capacitor mount body including the same.

2. Description of the Related Art

An example of the related art that discloses a multilayer ceramic capacitor in which the occurrence of cracks may be suppressed is Japanese Unexamined Patent Application Publication No. 2012-248581.

In the multilayer ceramic capacitor disclosed in this publication, a base unit includes an inner electrode body (inner layer portion) and first and second dielectric bodies (outer layer portions). The inner electrode body includes first inner electrodes and second inner electrodes facing each other with a dielectric member therebetween and stacked on each other. The first and second dielectric bodies sandwich the inner electrode body therebetween in the stacking direction. The first dielectric body including a first main surface of the base unit is thicker than the second dielectric body including a second main surface of the base unit in the stacking direction. One of the reasons why cracks occur is as follows. When a substrate having a multilayer ceramic capacitor mounted thereon is deflected due to an external force, an external stress is produced. This external stress acts on a dielectric layer of the multilayer ceramic capacitor, which causes the occurrence of cracks. The present inventors have discovered another reason why cracks occur. When a multilayer ceramic capacitor is subjected to firing, an internal stress is produced due to the difference in the coefficient of thermal contraction between dielectric layers and conductive layers. This internal stress acts on the boundary between the inner layer portion and the outer layer portion, thus causing the occurrence of cracks (delamination). The present inventors have also discovered that this type of crack is more likely to occur when the inner layer portion is made thick by increasing the number of layers to be stacked in order to increase the electrostatic capacitance of the multilayer ceramic capacitor.

In the multilayer ceramic capacitor disclosed in the above-described publication, the occurrence of cracks caused by an external stress may be suppressed, but the occurrence of cracks caused by an internal stress produced by the difference in the coefficient of thermal contraction between dielectric layers and conductive layers is not considered.

SUMMARY OF THE INVENTION

Preferred embodiments of the present invention have been conceived and developed in view of the above-described problem. Preferred embodiments of the present invention provide a multilayer ceramic capacitor in which it is possible to significantly reduce or prevent the occurrence of cracks caused by an internal stress produced by the difference in the coefficient of thermal contraction between dielectric layers and conductive layers while securing a sufficient electrostatic capacitance.

According to a preferred embodiment of the present invention, a multilayer ceramic capacitor includes a body and at least two outer electrodes. The body includes a plurality of dielectric layers and a plurality of conductive layers stacked on each other and includes first and second main surfaces opposing each other in a stacking direction. The outer electrodes are disposed on at least some surfaces of the body and are electrically connected to at least some of the plurality of conductive layers. The body includes first and second end surfaces which oppose each other so as to connect the first and second main surfaces and first and second side surfaces which oppose each other so as to connect the first and second main surfaces and also to connect the first and second end surfaces. The body includes an inner layer portion and first and second outer layer portions which sandwich the inner layer portion therebetween. The inner layer portion includes an area extending from a conductive layer positioned closest to the first main surface among the plurality of conductive layers to a conductive layer positioned closest to the second main surface among the plurality of conductive layers in the stacking direction. The height of the body in the stacking direction is smaller than the width of the body in a direction in which the first and second side surfaces are connected to each other with a shortest distance. The height of the inner layer portion in the stacking direction is smaller than the width of an area of the inner layer portion where the plurality of conductive layers are stacked in a direction in which the first and second side surfaces are connected to each other with a shortest distance. The height of the second outer layer portion is greater than that of the first outer layer portion. The total height of the first outer layer portion and the second outer layer portion is smaller than the height of the inner layer portion in the stacking direction.

The width of the body may be greater than about 0.9 mm and the height of the body may be smaller than about 0.9 mm, for example.

The height of the second outer layer portion may be about 90 μm or greater and may be equal to or smaller than about ¼ of the height of the inner layer portion, for example.

The second outer layer portion may include an outer portion including the second main surface and an inner portion disposed between the outer portion and the inner layer portion. The composition ratio of Si to Ti of a dielectric layer included in the outer portion may be higher than that of dielectric layers, which are some of the plurality of dielectric layers, included in the inner layer portion and a dielectric layer included in the inner portion.

The height of the outer portion may be equal to or greater than that of the inner portion in the stacking direction.

The outer portion may include a boundary region adjacent to the inner portion which has a larger Si content compared to a central region of the inner portion.

The difference between the height of the second outer layer portion and that of the first outer layer portion may be about 10 μm or greater, for example.

As viewed from a direction in which the first and second side surfaces are connected to each other, the boundary region may include a portion which inclines toward the center of the body in the width direction as the boundary region is positioned closer to the first and second end surfaces.

The composition ratio of a rare earth element to Ti of the dielectric layer included in the outer portion may be higher than that of the dielectric layer included in the inner portion.

The composition ratio of Dy to Ti of the dielectric layer included in the outer portion may be higher than that of the dielectric layer included in the inner portion.

The composition ratio of Mn to Ti of the dielectric layer included in the outer portion may be higher than that of the dielectric layer included in the first outer layer portion.

According to another preferred embodiment of the present invention, a multilayer ceramic capacitor series includes a plurality of the above-described multilayer ceramic capacitors and a package including an elongated carrier tape and a cover tape. The elongated carrier tape includes a plurality of cavities disposed apart from each other in which the plurality of multilayer ceramic capacitors are stored. The cover tape is attached to the elongated carrier tape so as to cover the plurality of cavities. The plurality of multilayer ceramic capacitors are stored in the plurality of respective cavities such that the second main surfaces of the plurality of multilayer ceramic capacitors face bottom sides of the plurality of respective cavities.

According to another preferred embodiment of the present invention, a multilayer ceramic capacitor mount body includes the above-described multilayer ceramic capacitor and a substrate on which the multilayer ceramic capacitor is mounted. The multilayer ceramic capacitor is mounted on the substrate with the second main surface facing the substrate.

The substrate may include a pair of lands on a surface of the substrate. The pair of lands may be electrically connected to a pair of outer electrodes of the multilayer ceramic capacitor. In the width direction of the body, the width of the pair of lands is smaller than the width of the body.

In the width direction of the body, the width of the pair of lands may be smaller than the width of the inner layer portion.

According to preferred embodiments of the present invention, in a multilayer ceramic capacitor, it is possible to significantly reduce or prevent the occurrence of cracks caused by an internal stress produced by the difference in the coefficient of thermal contraction between dielectric layers and conductive layers while securing a sufficient electrostatic capacitance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
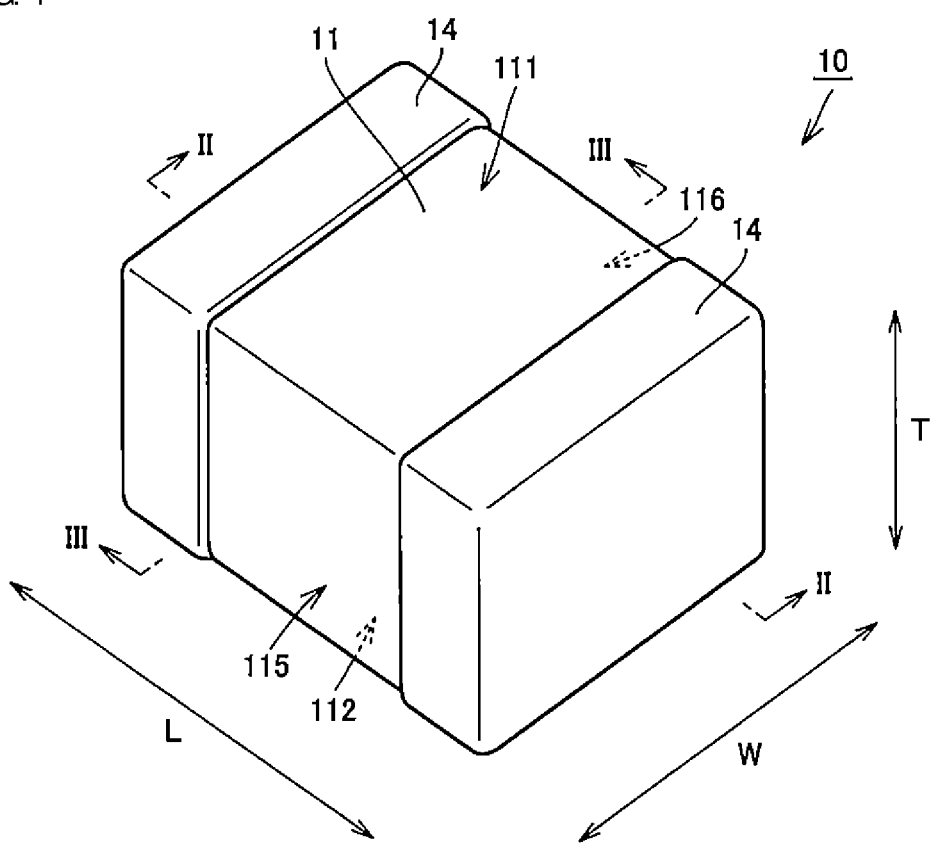
FIG. 1 is an external perspective view of a multilayer ceramic capacitor according to a first preferred embodiment of the present invention.

A description will be given below, with reference to the accompanying drawings, of a multilayer ceramic capacitor, a multilayer ceramic capacitor series including the same, and a multilayer ceramic capacitor mount body including the same according to preferred embodiments of the present invention. In the following description of the preferred embodiments, the same element or corresponding elements shown in the drawings are designated by like reference numeral, and an explanation thereof will be given only once. The multilayer ceramic capacitor will be simply referred to as a "capacitor".

First Preferred Embodiment

Figure 2:
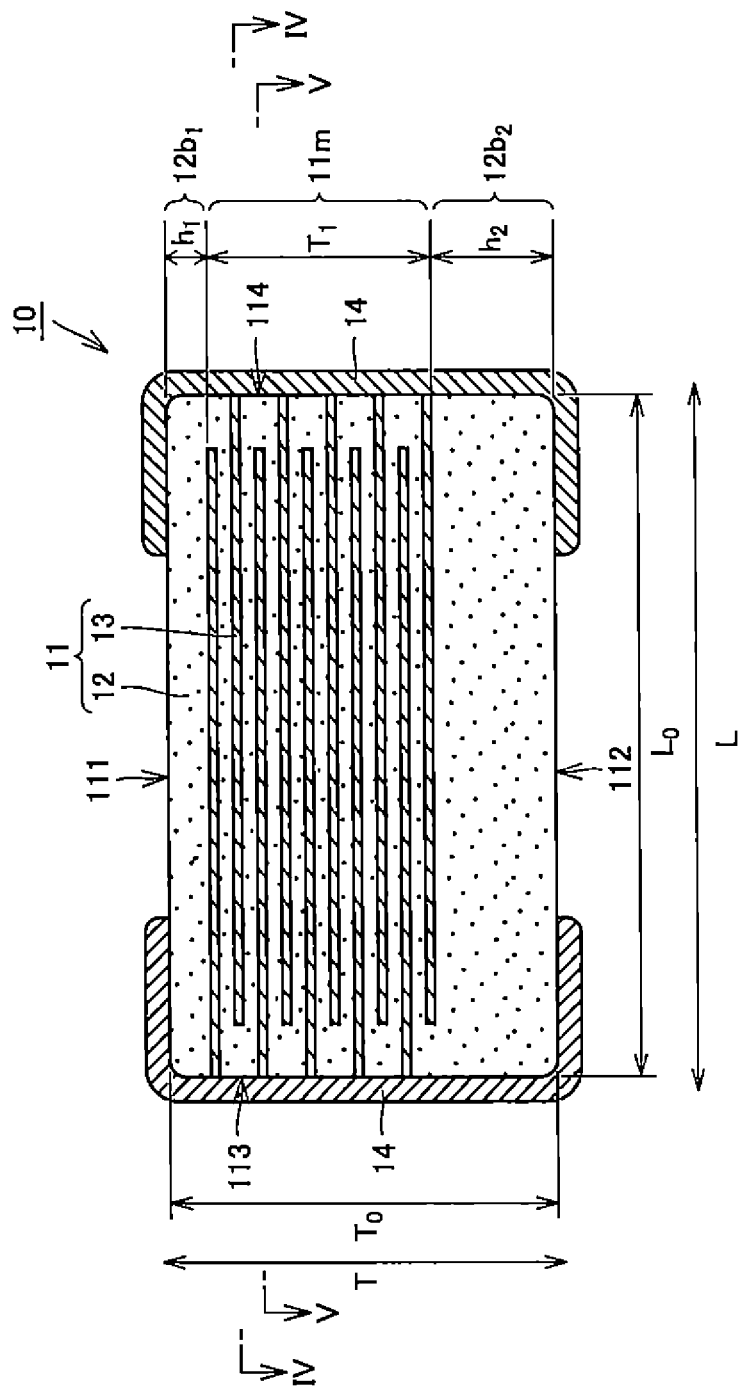
FIGS. 2 and 3 are sectional views taken along lines II-II and III-III, respectively, of FIG. 1.
Figure 3:
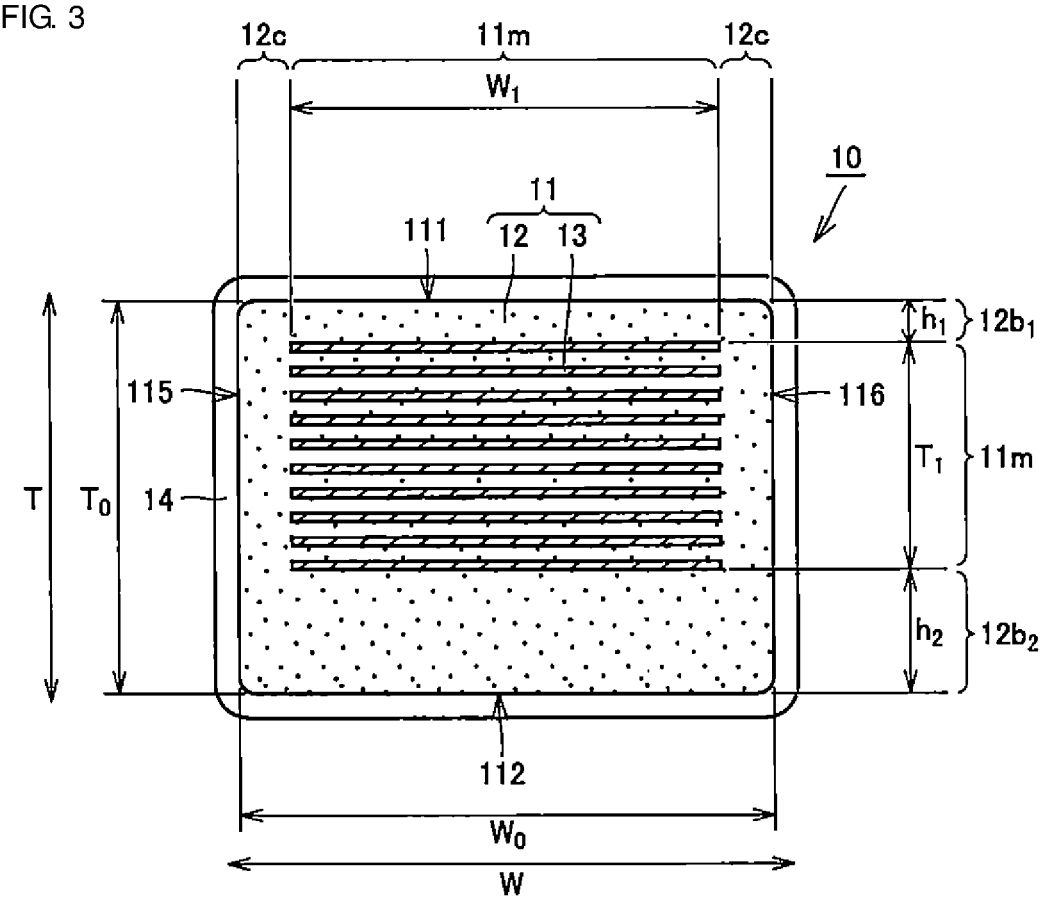
Figure 4:
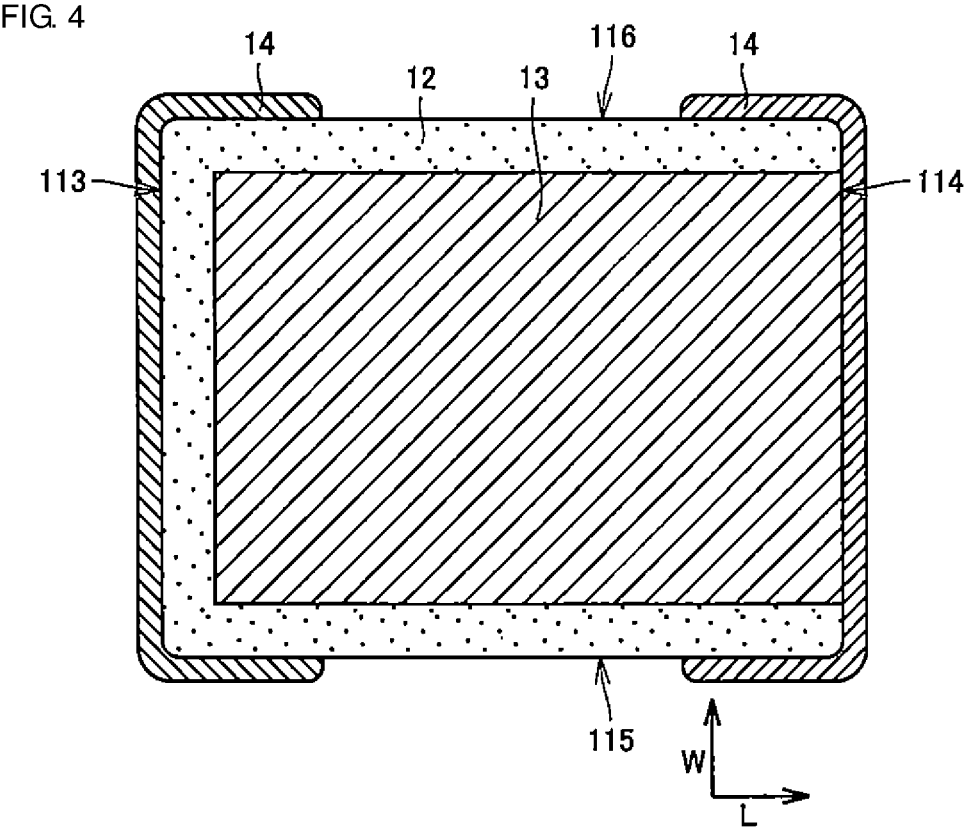
FIGS. 4 and 5 are sectional views taken along lines IV-IV and V-V, respectively, of FIG. 2.
Figure 5:
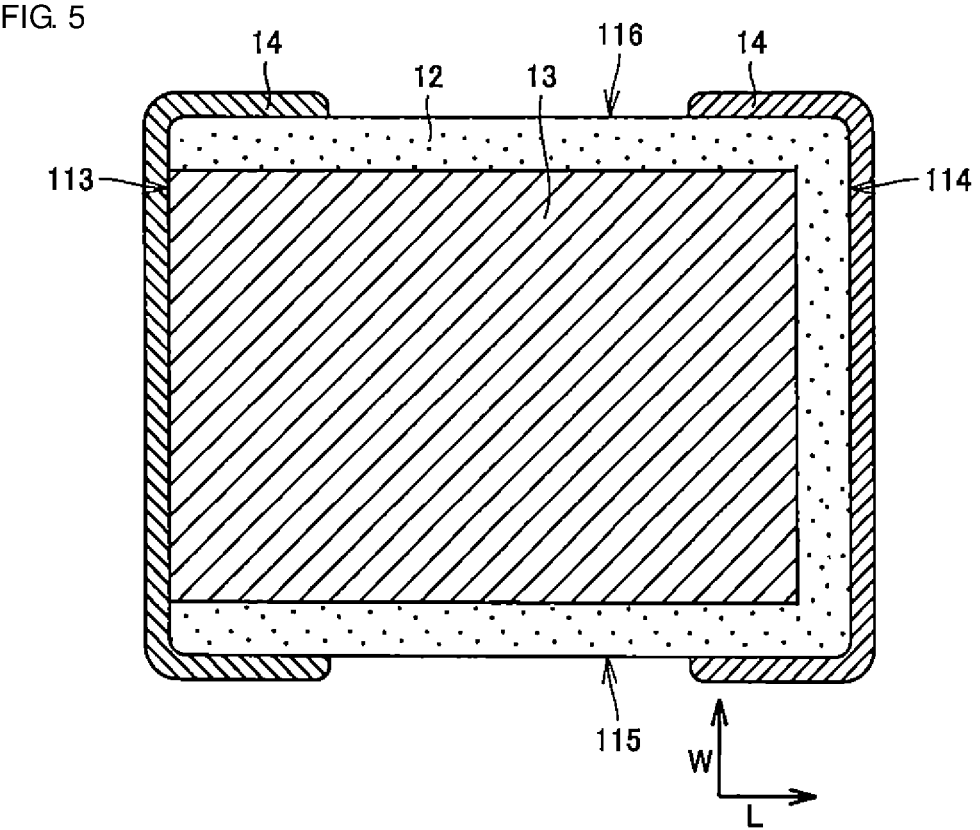

FIG. 1 is an external perspective view of a capacitor according to a first preferred embodiment of the present invention. FIGS. 2 and 3 are sectional views taken along lines II-II and III-III, respectively, of FIG. 1. FIGS. 4 and 5 are sectional views taken along lines IV-IV and V-V, respectively, of FIG. 2. In FIGS. 1 through 5, the length direction of a body 11, which will be discussed below, is indicated by L, the width direction thereof is indicated by W, and the height direction thereof is indicated by T.

As shown in FIGS. 1 through 5, the capacitor 10 includes the body 11 and two outer electrodes 14. The body 11 includes a plurality of dielectric layers 12 and a plurality of conductive layers 13 stacked on each other, and has first and second main surfaces 111 and 112 opposing each other in the stacking direction. The two outer electrodes 14 are disposed on some surfaces of the body 11 and are electrically connected to some of the plurality of conductive layers 13.

The stacking direction of the dielectric layers 12 and the conductive layers 13 is perpendicular to the length direction L and the width direction W of the body 11. That is, the stacking direction of the dielectric layers 12 and the conductive layers 13 is parallel with the height direction T of the body 11.

The body 11 includes first and second end surfaces 113 and 114. The first and second end surfaces 113 and 114 oppose each other so as to connect the first and second main surfaces 111 and 112. The body 11 also includes first and second side surfaces 115 and 116. The first and second side surfaces 115 and 116 oppose each other so as to connect the first and second main surfaces 111 and 112 also to connect the first and second end surfaces 113 and 114. The body 11 preferably has a rectangular or substantially rectangular parallelepiped shape, and may have a rounded portion at least in one of a corner and a ridge of the body 11.

The shortest distance between the first and second side surfaces 115 and 116 is smaller than that between the first and second end surfaces 113 and 114. That is, the width $W_0$ of the body 11 in the width direction W is smaller than the length $L_0$ of the body 11 in the length direction L. The height $T_0$ of the body 11 in the stacking direction is smaller than the width $W_0$ of the body 11 in a direction in which the first and second side surfaces 115 and 116 are connected to each other with the shortest distance. The height $T_0$ of the body 11 is preferably greater than about ⅓ of the length $L_0$ of the body 11 and smaller than about ½ of the length $L_0$ of the body 11, for example, which will be discussed later. The height $T_0$ of the body 11 is preferably smaller than the width $W_1$ of an inner layer portion 11m, which will be discussed later. The width $W_0$ of the body 11 is preferably greater than about 0.9 mm, and the height $T_0$ of the body 11 is preferably smaller than about 0.9 mm, for example.

The body 11 includes an inner layer portion 11m and first and second outer layer portions $12b_1$ and $12b_2$ which sandwich the inner layer portion 11m therebetween. The inner layer portion 11m includes an area extending from a conductive layer 13 positioned closest to the first main surface 111 among the plurality of conductive layers 13 to a conductive layer 13 positioned closest to the second main surface 112 among the plurality of conductive layers 13 in the stacking direction of the body 11.

The first outer layer portion $12b_1$ includes a dielectric layer 12 positioned closest to the first main surface 111 among the plurality of dielectric layers 12. The second outer layer portion $12b_2$ includes a dielectric layer 12 positioned closest to the second main surface 112 among the plurality of dielectric layers 12.

In the inner layer portion 11m, at least some of the plurality of dielectric layers 12 and the plurality of conductive layers 13 are alternately stacked on each other. That is, the inner layer portion 11m includes all the conductive layers 13. All the conductive layers 13 preferably are rectangular or substantially rectangular, as viewed from above, as shown in FIGS. 4 and 5.

In the first preferred embodiment, all the conductive layers 13 preferably are electrically connected to either one of the two outer electrodes 14. Alternatively, at least some of the conductive layers 13 may be electrically connected to one of the outer electrodes 14. That is, among the plurality of conductive layers 13, there may be some conductive layers 13 that are not electrically connected to any outer electrodes 14.

The two outer electrodes 14 are disposed at both ends of the body 11 in the length direction L. More specifically, one of the two outer electrodes 14 is disposed at one end of the body 11 close to the first end surface 113 in the length direction L, while the other one of the two outer electrodes 14 is disposed at the other end of the body 11 close to the second end surface 114 in the length direction L. In the first preferred embodiment, one of the two outer electrodes 14 extends from the first end surface 113 continuously to the first and second main surfaces 111 and 112 and to the first and second side surfaces 115 and 116. The other one of the two outer electrodes 14 extends from the second end surface 114 continuously to the first and second main surfaces 111 and 112 and to the first and second side surfaces 115 and 116. However, the arrangement of the two outer electrodes 14 is not restricted to that described above. The two outer electrodes 14 may be disposed on some surfaces of the body 11 to be electrically connected to the plurality of conductive layers 13 and so that the capacitor 10 can be mounted.

One of the two outer electrodes 14 is connected to some of the plurality of conductive layers 13 on the first end surface 113, while the other one of the two outer electrodes 14 is connected to the remaining conductive layers 13 on the second end surface 114. The conductive layers 13 connected to the first end surface 113 and the remaining conductive layers 13 connected to the second end surface 114 are alternately stacked on each other such that they face each other with a first dielectric layer 12 therebetween in the inner layer portion 11m.

As shown in FIG. 3, the height $T_1$ of the inner layer portion 11m in the stacking direction of the body 11 is smaller than the width $W_1$ of the inner layer portion 11m where the plurality of conductive layers 13 are positioned, in the width direction W of the body 11 in which the first and second side surfaces 115 and 116 are connected to each other with the shortest distance.

The second outer layer portion $12b_2$ is thicker than the first outer layer portion $12b_1$. That is, the height $h_2$ of the second outer layer portion $12b_2$ is greater than the height $h_1$ of the first outer layer portion $12b_1$. The total height of the height $h_1$ of the first outer layer portion $12b_1$ and the height $h_2$ of the second outer layer portion $12b_2$ is smaller than the height $T_1$ of the inner layer portion 11m. The difference between the height $h_2$ of the second outer layer portion $12b_2$ and the height $h_1$ of the first outer layer portion $12b_1$ is preferably equal to or greater than about 10 μm, for example. It is preferable that the height $h_2$ of the second outer layer portion $12b_2$ be equal to or greater than about 90 μm and be equal to or smaller than about ¼ of the height $T_1$ of the inner layer portion 11m, for example.

The height $T_0$ of the body 11 in the stacking direction of the body 11 is equal to the total height of the height $T_1$ of the inner layer portion 11m, the height $h_1$ of the first outer layer portion $12b_1$, and the height $h_2$ of the second outer layer portion $12b_2$.

It is preferable that, in the width direction W of the body 11, the maximum width of side gaps 12c provided between each of the first and second side surfaces 115 and 116 and the inner layer portion 11m be greater than the height $h_1$ of the first outer layer portion $12b_1$. It is also preferable that the average width $((W_0-W_1)/2)$ of the side gaps 12c be greater than the height $h_1$ of the first outer layer portion $12b_1$. It is more preferable that the maximum width or the average width $((W_0-W_1)/2)$ of the side gaps 12c be greater than about 30 µm and smaller than about 90 µm, for example. The maximum width and the average width $((W_0-W_1)/2)$ of the side gaps 12c will be discussed later.

The configuration of each of the elements defining the capacitor 10 will be described in detail.

The plurality of dielectric layers 12 each preferably contain a perovskite compound expressed by $ABO_3$ ("A" contains Ba, and "B" contains Ti, and O is oxygen) as a principal component. That is, the plurality of dielectric layers 12 each contain barium titanate ($BaTiO_3$) as a principal component.

The plurality of dielectric layers 12 each contain Si as a secondary component. Si is contained in the dielectric layers 12 by adding a Si compound, such as glass or $SiO_2$, as a secondary component to a perovskite compound expressed by $ABO_3$ as a principal component. Another compound, such as a Mn compound, an Mg compound, a Co compound, a Ni compound, or a rare earth compound, may be added to a perovskite compound expressed by $ABO_3$.

As a material for each of the plurality of conductive layers 13, a metal, such as Ni, Cu, Ag, Pd, or Au, or an alloy containing at least one of such metals (for example, an alloy of Ag and Pd) may be used. The thickness of each conductive layer 13 after a firing step is preferably about 0.4 to 0.9 µm, for example. If the thickness of each of the conductive layers 13 is smaller than about 0.4 µm, it is difficult to secure the coverage of the conductive layers 13. If the thickness of each of the conductive layers 13 is greater than about 0.9 µm, it is difficult to secure the electrostatic capacitance per unit volume of the capacitor 10.

The two outer electrodes 14 each include a foundation layer which covers both end portions of the body 11 and a plated layer which covers this foundation layer. As a material for the foundation layer, a metal, such as Ni, Cu, Ag, Pd, or Au, or an alloy containing at least one of such metals (for example, an alloy of Ag and Pd) may be used. The thickness of the foundation layer is preferably about 10.0 to 50.0 µm, for example.

The foundation layer may be formed by baking a conductive paste applied to both end portions of the body 11 which has been fired. Alternatively, the foundation layer may be formed by firing, together with the conductive layers 13, a conductive paste applied to both end portions of the body 11 which has not been fired. Alternatively, the foundation layer may be formed by plating both end portions of the body 11 or by curing a conductive resin containing thermosetting resin applied to both end portions of the body 11.

If the foundation layer is made of a conductive resin, it is possible to reduce a load imposed on the body 11 caused by an external stress which is produced when a substrate having the capacitor 10 mounted thereon is deflected due to an external force and thus to significantly reduce or prevent the occurrence of cracks in the body 11. Accordingly, by forming the second outer layer portion $12b_2$ thick and then by forming the two outer electrodes 14 having a conductive resin, the occurrence of cracks in the body 11 can further be significantly reduced or prevented.

As a material for the plated layer, a metal, such as Sn, Ni, Cu, Ag, Pd, or Au, or an alloy containing at least one of such metals (for example, an alloy of Ag and Pd) may be used.

The plated layer may be constituted by a plurality of layers. In this case, the plated layer is preferably a two-layer structure in which a Sn plated layer is formed on a Ni plated layer. In this case, the Ni plated layer functions as a solder barrier layer, while the Sn plated layer improves solder wettability. The thickness of one plated layer is preferably about 1.0 to 10.0 µm.

Figure 6:
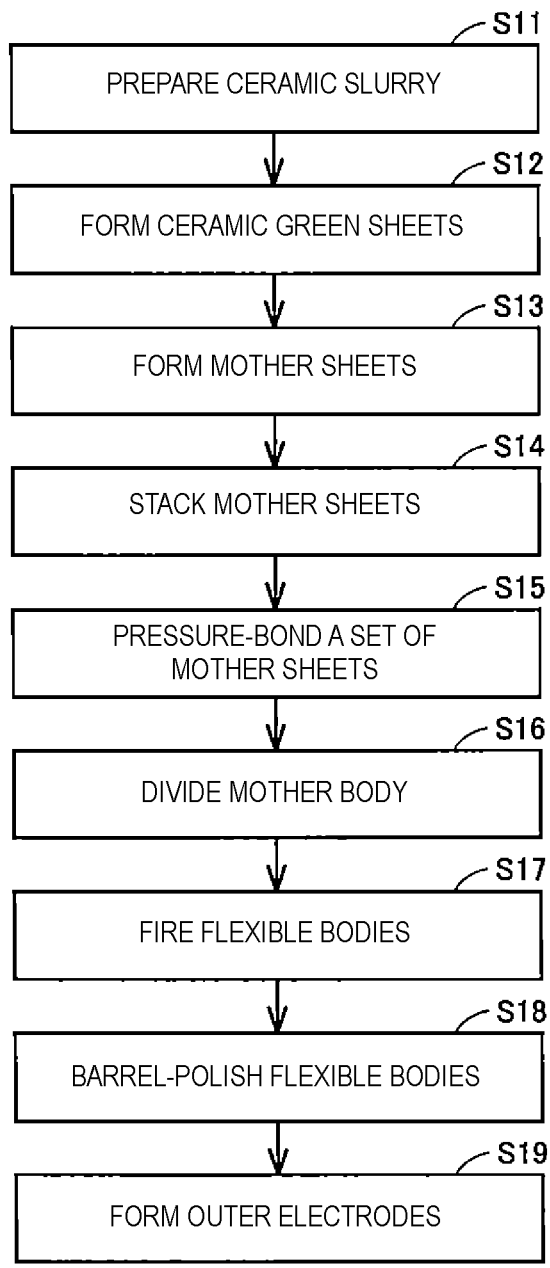
FIG. 6 is a flowchart illustrating a manufacturing method for a multilayer ceramic capacitor according to the first preferred embodiment of the present invention.

A manufacturing method for the capacitor 10 according to the first preferred embodiment of the present invention will be described below with reference to the flowchart of FIG. 6. In this manufacturing method, a plurality of capacitors 10 are mass-produced at one time together in the following manner. Elements which will form a plurality of capacitors 10 are processed together until a halfway point through a manufacturing process so as to fabricate a mother body. Then, the mother body is divided into individual flexible bodies. The individual flexible bodies are then processed, thus manufacturing a plurality of capacitors 10.

In step S11, ceramic slurry is prepared first. More specifically, a ceramic powder, a binder, and a solvent are mixed at a predetermined mixing ratio so as to form the ceramic slurry.

Then, in step S12, ceramic green sheets are formed. More specifically, the ceramic slurry is formed into a sheet shape on a carrier film by using a die coater, a gravure coater, or a micro gravure coater, thus forming the ceramic green sheets.

Then, in step S13, mother sheets are formed. More specifically, a conductive paste is printed on each ceramic green sheet by using screen printing or gravure printing such that a predetermined conductive pattern is formed on the ceramic green sheet. As a result, a mother sheet, which is a ceramic green sheet having a predetermined conductive pattern thereon, is formed.

Then, in step S14, the mother sheets are stacked. By stacking the plurality of mother sheets according to a predetermined rule, a set of mother sheets is formed. In the first preferred embodiment, a plurality of mother sheets forming the first outer layer portion $12b_1$, a plurality of mother sheets forming the inner layer portion $11m$, and a plurality of mother sheets forming the second outer layer portion $12b_2$ are stacked on each other in this order, thus forming a set of mother sheets.

Then, in step S15, the set of mother sheets is pressure-bonded. A flat die, which is not shown, is pressed against the mother sheets forming the second outer layer portion $12b_2$ along the stacking direction, thus pressure-bonding the set of mother sheets placed on a base, which is not shown. As a result, a mother body is fabricated.

Then, in step S16, the mother body is divided. More specifically, the mother body is press-cut or cut with a dicing machine in a matrix into flexible bodies.

Then, in step S17, the flexible bodies are fired. More specifically, the flexible bodies are heated to a predetermined temperature so as to fire the ceramic dielectric material and the conductive material. The firing temperature is set suitably in accordance with the type of ceramic dielectric material and the type of conductive material, and may be set within a range of about 900 to 1300° C.

Then, in step S18, the flexible bodies are barrel-polished. More specifically, the flexible bodies subjected to firing are sealed within a small box called a barrel, together with media balls having a higher hardness than the ceramic material. Then, by rotating the barrel, the flexible bodies are polished. By performing this barrel-polishing, the outer surfaces (in particular, corners and ridges) of the flexible bodies are curved and rounded. As a result, the body 11 is formed.

Then, in step S19, outer electrodes are formed. More specifically, a conductive paste is applied to an end portion including the first end surface 113 and an end portion including the second end surface 114 of the body 11 so as to form a metal film, and then, the metal film is fired. Then, the metal film is sequentially Ni-plated and Sn-plated. As a result, the two outer electrodes 14 are formed on the outer surfaces of the body 11.

Through the above-described series of steps, the capacitor 10 configured as shown in FIGS. 1 through 5 is manufactured.

In the capacitor 10 of the first preferred embodiment, the height $T_0$ of the body 11 is smaller than the width $W_0$ of the body 11, and the height $T_1$ of the inner layer portion 11$m$ is smaller than the width $W_1$ of the inner layer portion 11$m$. That is, by increasing the width of the conductive layers 13 while maintaining the size of the side gaps 12$c$ without increasing the number of layers within the inner layer portion 11$m$, a sufficient electrostatic capacitance of the capacitor 10 is secured. Since the height $T_0$ of the body 11 is smaller than the width $W_0$ of the body 11, the main surfaces 111 and 112 and the side surfaces 115 and 116 can be distinguished from each other from the outer configuration of the body 11.

It is now assumed that, for securing a sufficient electrostatic capacitance, the height $T_1$ of the inner layer portion 11$m$ is increased by increasing the number of layers within the inner layer portion 11$m$. In this case, the internal stress produced by the difference in the coefficient of thermal contraction between the dielectric layers 12 and the conductive layers 13 during the firing step for the capacitor 10 is increased. Additionally, when pressure-bonding a set of mother sheets, the pressure is less likely to be applied to the plurality of dielectric layers 12 positioned in the side gaps 12$c$, thus decreasing the adherence between the dielectric layers 12 in the side gaps 12$c$. As a result, it is more likely that cracks (delamination) will occur at the boundary between the inner layer portion 11$m$ and the second outer layer portion 12$b_2$.

Even if the width $W_1$ of the inner layer portion 11$m$ is increased, the internal stress produced by the difference in the coefficient of thermal contraction between the dielectric layers and the conductive layers 13 during the firing step is not significantly increased. Accordingly, by increasing the width $W_1$ of the conductive layers 13 while maintaining the size of the side gaps 12$c$ without increasing the number of layers within the inner layer portion 11$m$, it is possible to significantly reduce or prevent the occurrence of cracks caused by an internal stress produced by the difference in the coefficient of thermal contraction between the dielectric layers 12 and the conductive layers 13 while securing a sufficient electrostatic capacitance of the capacitor 10.

As described above, the total height of the height $h_1$ of the first outer layer portion 12$b_1$ and height $h_2$ of the second outer layer portion 12$b_2$ is smaller than the height $T_1$ of the inner layer portion 11$m$. It is thus possible to secure the electrostatic capacitance per unit volume of the capacitor 10.

As described above, the second outer layer portion 12$b_2$ is greater than the first outer layer portion 12$b_1$. Thus, cracks produced in the dielectric layers 12 of the capacitor 10 caused by an external stress produced when a substrate having the capacitor 10 mounted thereon is deflected due to an external force may be prevented from reaching the conductive layers 13. More specifically, the difference between the height $h_2$ of the second outer layer portion 12$b_2$ and the height $h_1$ of the first outer layer portion 12$b_1$ is equal to or greater than about 10 μm. By forming the height $h_2$ of the second outer layer portion 12$b_2$ to be about 90 μm or greater, it is possible to prevent the above-described cracks from reaching the conductive layers 13.

However, if the height $h_2$ of the second outer layer portion 12$b_2$ is excessively large, the internal stress produced by the difference in the coefficient of thermal contraction between the dielectric layers 12 and the conductive layers 13 during the firing step is increased, and the electrostatic capacitance per unit volume of the capacitor 10 is decreased. By setting the height $h_2$ of the second outer layer portion 12$b_2$ to be equal to or smaller than about ¼ of the height $T_1$ of the inner layer portion 11$m$, it is possible to significantly reduce or prevent an increase in the internal stress produced by the difference in the coefficient of thermal contraction between the dielectric layers 12 and the conductive layers 13 during the firing step and also to significantly reduce or prevent a decrease in the electrostatic capacitance per unit volume of the capacitor 10.

As described above, the height $T_0$ of the body 11 is preferably greater than about ⅓ of the length $L_0$ of the body 11 in the length direction L and is also preferably smaller than about ½ of the length $L_0$ of the body 11. With this configuration, while the height of the body 11 is decreased, the possibility that the capacitor 10, which is thin, will be broken due to the insufficient strength when an external force is applied to the capacitor 10 can be reduced.

As described above, the height $T_0$ of the body 11 is preferably smaller than the width $W_1$ of the inner layer portion 11$m$. With this configuration, the space factor of the conductive layers 13 within the body 11 is increased, and accordingly, the Young's modulus is increased. It is thus possible to reduce the possibility that the capacitor 10, which is thin, will be broken due to the insufficient strength when an external force is applied to the capacitor 10.

As described above, the width $W_0$ of the body 11 is preferably greater than about 0.9 mm and the height $T_0$ of the body 11 is preferably smaller than about 0.9 mm. With this configuration, the capacitor 10 can be suitably used in a thin electronic device.

As described above, the maximum width of the side gaps 12$c$ is preferably greater than the height $h_1$ of the first outer layer portion 12$b_1$. If the first outer layer portion 12$b_1$ is thin, it is possible to reduce the internal stress which is produced in the firing step due to the difference in the coefficient of thermal contraction between the dielectric layers and the conductive layers and which acts on the boundary between the inner layer portion 11$m$ and the first outer layer portion 12$b_1$. Thus, the occurrence of cracks (delamination) at the boundary between the inner layer portion 11$m$ and the first outer layer portion 12$b_1$ can be significantly reduced or prevented.

If the maximum width of the side gaps 12$c$ is increased, when pressure-bonding a set of mother sheets, the pressure is more likely to be applied to the plurality of dielectric layers 12 positioned in the side gaps 12$c$, thus enhancing the adherence of the dielectric layers 12 in the side gaps 12$c$. As a result, it is possible to significantly reduce or prevent the occurrence of cracks (delamination) in the dielectric layers 12 positioned in the side gaps 12$c$.

As described above, the average width $((W_0-W_1)/2)$ of the side gaps 12$c$ is preferably greater than the height $h_1$ of the first outer layer portion 12$b_1$. The half of the total width of the two adjacent side gaps 12$c$ of two adjacent bodies 11 divided from the mother body corresponds to the average width $((W_0-W_1)/2)$. Accordingly, if the average width $((W_0-W_1)/2)$ of the side gaps 12$c$ is set to be greater than the height $h_1$ of the first outer layer portion 12$b_1$, when pressure-bonding a set of mother sheets, the pressure is more likely to be applied to the plurality of dielectric layers 12 positioned in the side gaps 12$c$, thus enhancing the adherence of the dielectric layers 12 positioned in the side gaps 12c. As a result, it is possible to significantly reduce or prevent the occurrence of cracks (delamination) in the dielectric layers 12 positioned in the side gaps 12c. That is, even if there is a difference between the width of the side gap 12c close to the first side surface 115 and that close to the second side surface 116, the effect of significantly reducing or preventing the occurrence of cracks (delamination) can be stably exhibited.

As described above, the maximum width or the average width (($W_0-W_1$)/2) of the side gaps 12c is more preferably greater than about 30 µm and smaller than about 90 µm, for example. If the maximum width or the average width (($W_0-W_1$)/2) of the side gaps 12c is greater than about 30 µm, the occurrence of cracks (delamination) at the boundary between the inner layer portion 11m and the second outer layer portion $12b_2$ is reliably significantly reduced or prevented. If the maximum width or the average width (($W_0-W_1$)/2) of the side gaps 12c is equal to or greater than about 90 µm, the electrostatic capacitance of the capacitor 10 becomes too small. That is, by setting the maximum width or the average width (($W_0-W_1$)/2) of the side gaps 12c to be smaller than about 90 µm, a sufficient electrostatic capacitance of the capacitor 10 is secured.

A capacitor mount body including the capacitor 10 of the first preferred embodiment mounted thereon will be described below with reference to FIG. 7.

Figure 7:
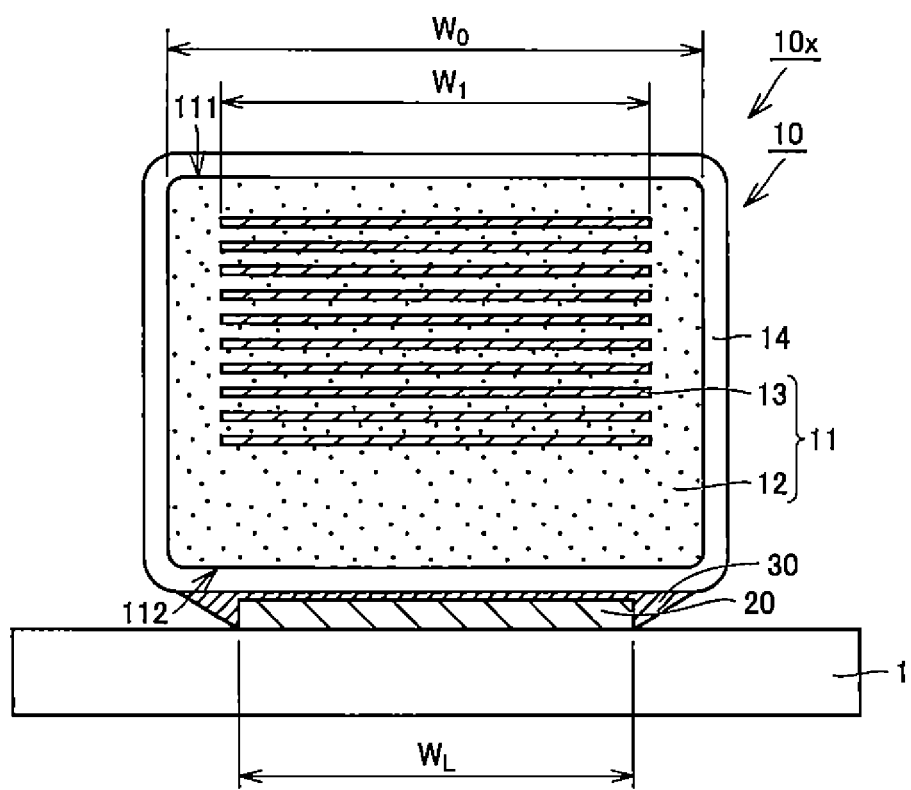
FIG. 7 is a sectional view illustrating the configuration of a multilayer ceramic capacitor mount body according to the first preferred embodiment of the present invention.

FIG. 7 is a sectional view illustrating a capacitor mount body 10x of the first preferred embodiment. The capacitor mount body 10x includes the capacitor 10 and a substrate 1, such as a circuit board, used to mount the capacitor 10 thereon. The capacitor 10 is mounted on the substrate 1 such that the second main surface 112 faces the substrate 1.

The configuration of the capacitor mount body 10x will be discussed more specifically. A pair of lands 20 is disposed on the surface of the substrate 1 such that the lands 20 are spaced apart from each other. The two outer electrodes 14 of the capacitor 10 and the two lands 20 are electrically connected to each other by solder 30, which is a bonding medium. The bonding medium is not restricted to solder, and any bonding material may be used as long as it is able to mechanically and electrically connect the two outer electrodes 14 and the two lands 20.

A width $W_L$ of the two lands 20 is smaller than the width $W_0$ of the body 11. The width $W_L$ of the two lands 20 is preferably smaller than the width $W_1$ of the inner layer portion 11m. By setting the width $W_L$ of the two lands 20 to be smaller than the width $W_0$ of the body 11, the two outer electrodes 14 are subjected to a compressive stress applied from the solder 30 in the width direction W of the body 11. This compressive stress further acts on the second outer layer portion $12b_2$. Accordingly, the internal stress acting on the boundary between the inner layer portion 11m and the second outer layer portion $12b_2$ is relaxed, thus significantly reducing or preventing the occurrence of cracks (delamination) at this boundary.

If the width $W_L$ of the two lands 20 is smaller than the width $W_1$ of the inner layer portion 11m, the compressive stress acting on the second outer layer portion $12b_2$ is increased. Accordingly, the internal stress acting on the boundary between the inner layer portion 11m and the second outer layer portion $12b_2$ is further relaxed, thus further significantly reducing or preventing the occurrence of cracks (delamination) at this boundary.

A capacitor series including a plurality of capacitors of the first preferred embodiment will be described below with reference to FIGS. 8 and 9.

Figure 8:
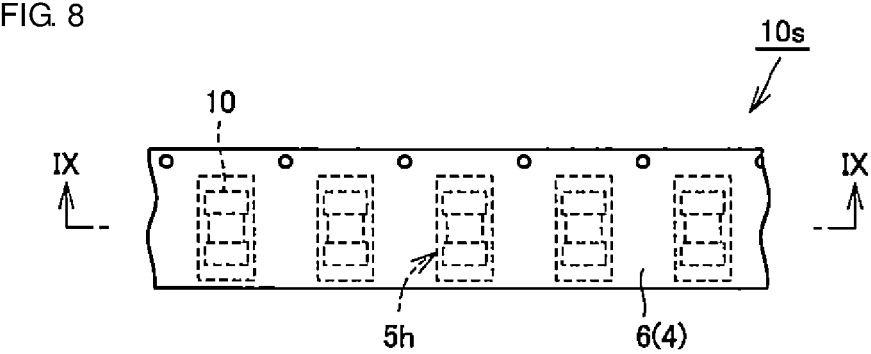
FIG. 8 is a plan view illustrating the configuration of a multilayer ceramic capacitor series according to the first preferred embodiment of the present invention.

FIG. 8 is a plan view of a capacitor series 10s according to the first preferred embodiment. FIG. 9 is a sectional view taken along line IX-IX of FIG. 8.

Figure 9:
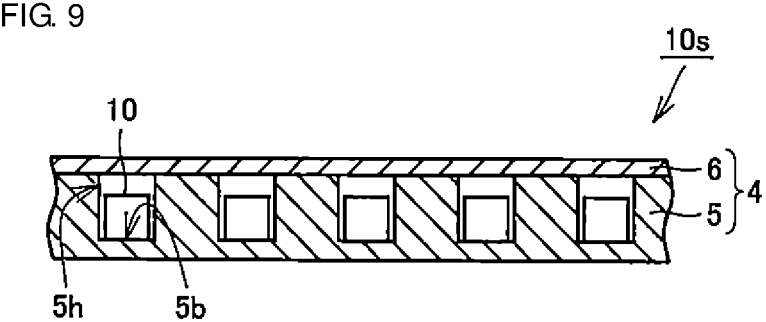
FIG. 9 is a sectional view taken along line IX-IX of FIG. 8.

As shown in FIGS. 8 and 9, the capacitor series 10s includes a plurality of capacitors 10 and a package 4. The package 4 includes an elongated carrier tape 5 and a cover tape 6. The carrier tape 5 includes a plurality of cavities 5h disposed apart from each other and storing the plurality of capacitors 10 therein. The cover tape 6 is attached to the carrier tape 5 so as to cover the plurality of cavities 5h. The plurality of capacitors 10 are stored in the respective cavities 5h such that the second main surfaces 112 face bottom sides 5b of the respective cavities 5h.

The plurality of capacitors 10 included in the capacitor series 10s are extracted from the package 4 one by one and are mounted on the substrate 1. More specifically, in the state in which the cover tape 6 is removed from the carrier tape 5, by sucking and holding the capacitors 10 at the side of the first main surfaces 111, the capacitors 10 are removed from the carrier tape 5 one by one and are mounted on the substrate 1. As a result, the capacitors 10 are mounted on the substrate 1 with the second main surfaces 112 facing the substrate 1.

That is, by using the capacitor series 10s of the first preferred embodiment, it is possible to easily manufacture the capacitor mount body 10x of the first preferred embodiment.

A capacitor and a capacitor mount body according to a second preferred embodiment will be described below with reference to the drawings. The major difference between the capacitor and the capacitor mount body of the second preferred embodiment and those of the first preferred embodiment is the configuration of the second outer layer portion. The configurations of the other elements of the second preferred embodiment will not be explained.

Second Preferred Embodiment

Figure 10:
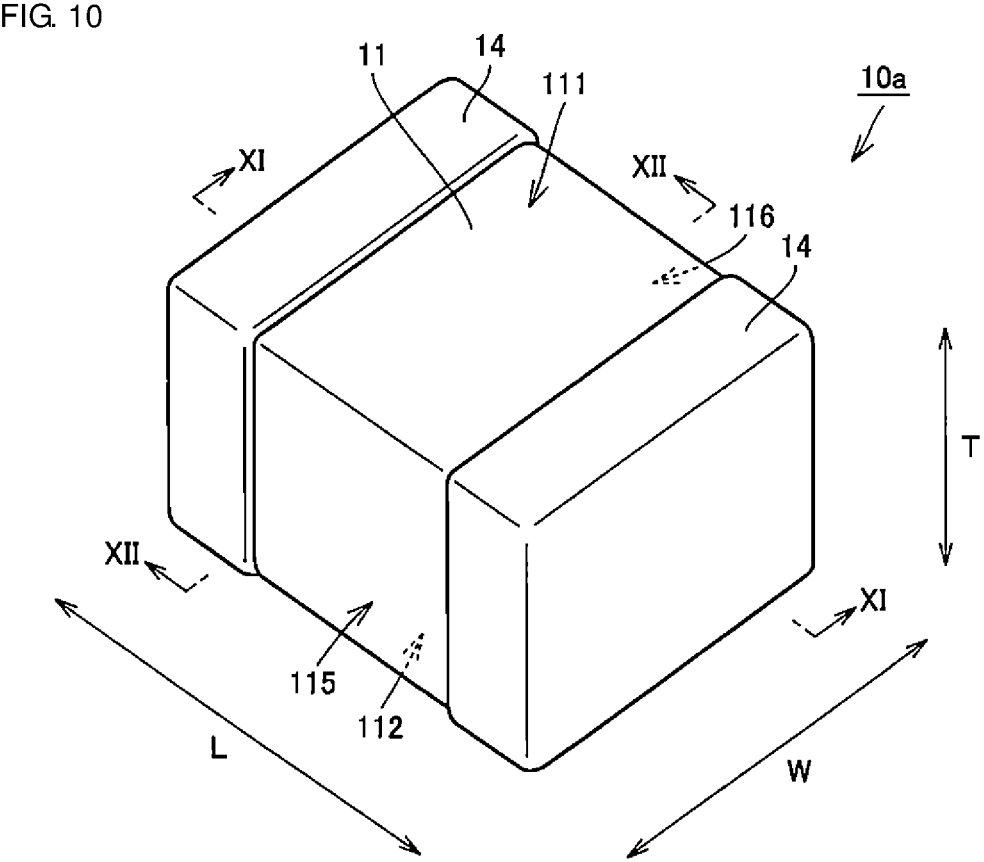
FIG. 10 is an external perspective view of a multilayer ceramic capacitor according to a second preferred embodiment of the present invention.
Figure 11:
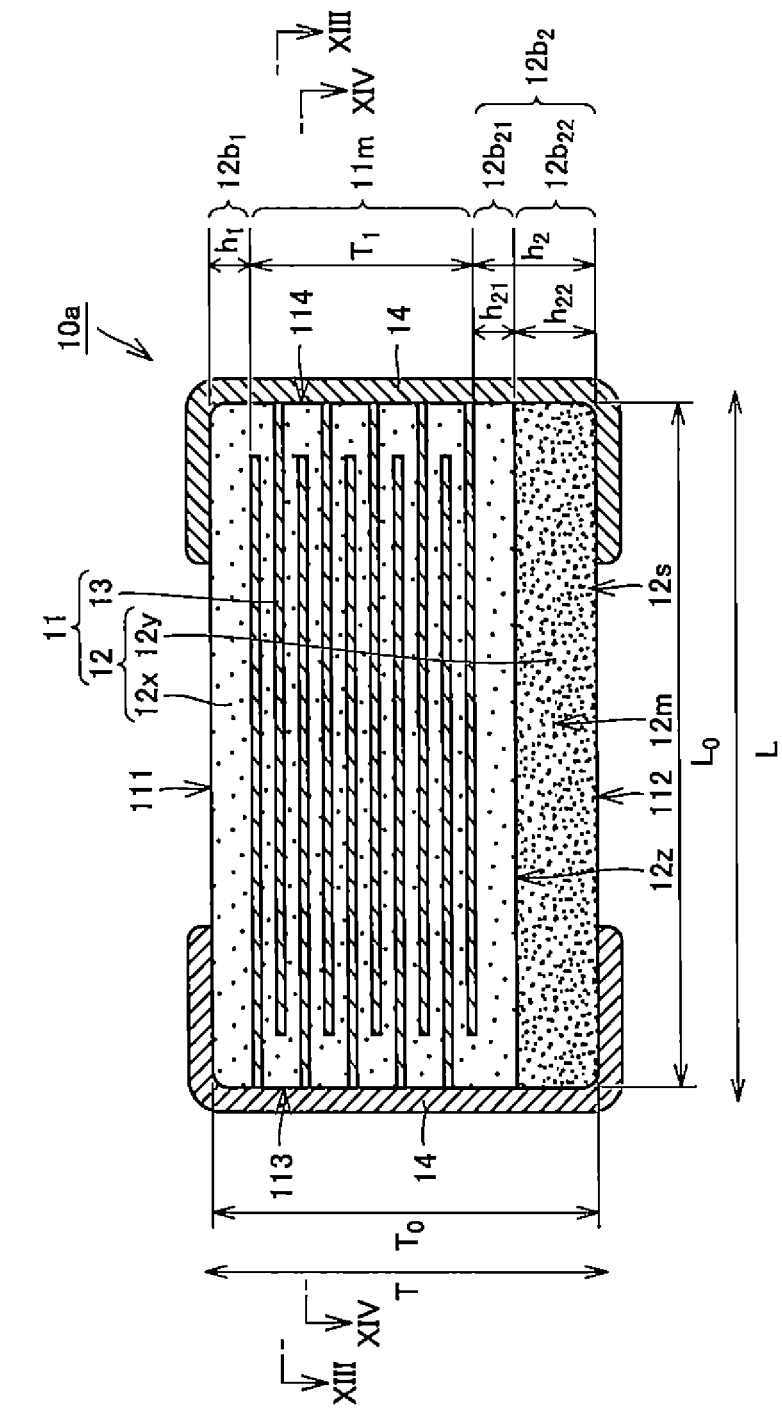
FIGS. 11 and 12 are sectional views taken along lines XI-XI and XII-XII, respectively, of FIG. 10.
Figure 12:
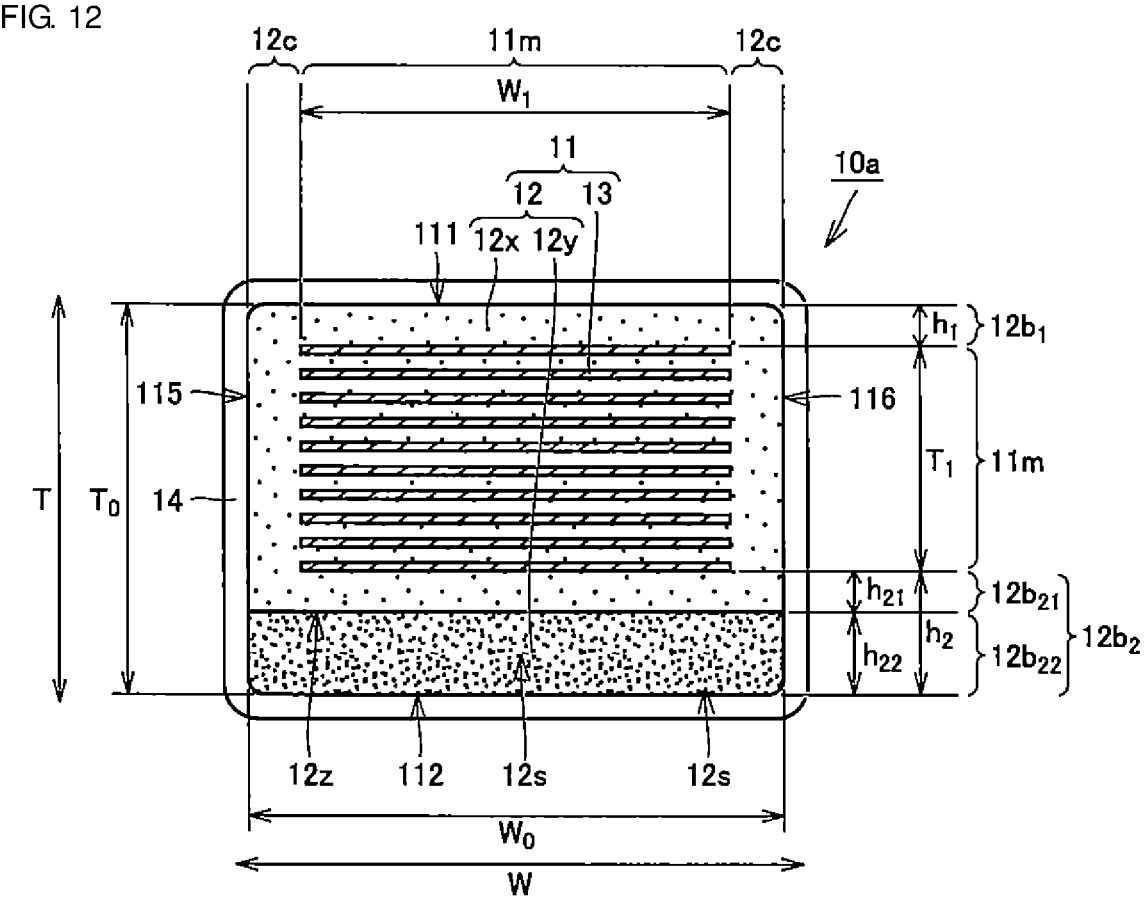
Figure 13:
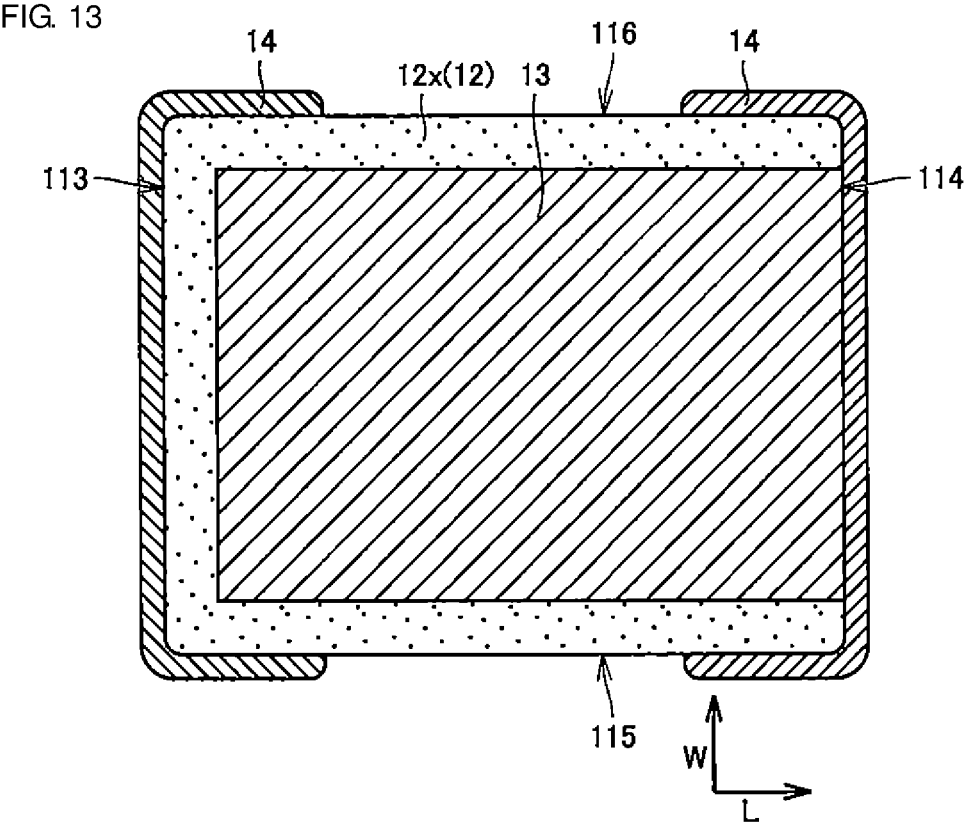
FIGS. 13 and 14 are sectional views taken along lines XIII-XIII and XIV-XIV, respectively, of FIG. 11.
Figure 14:
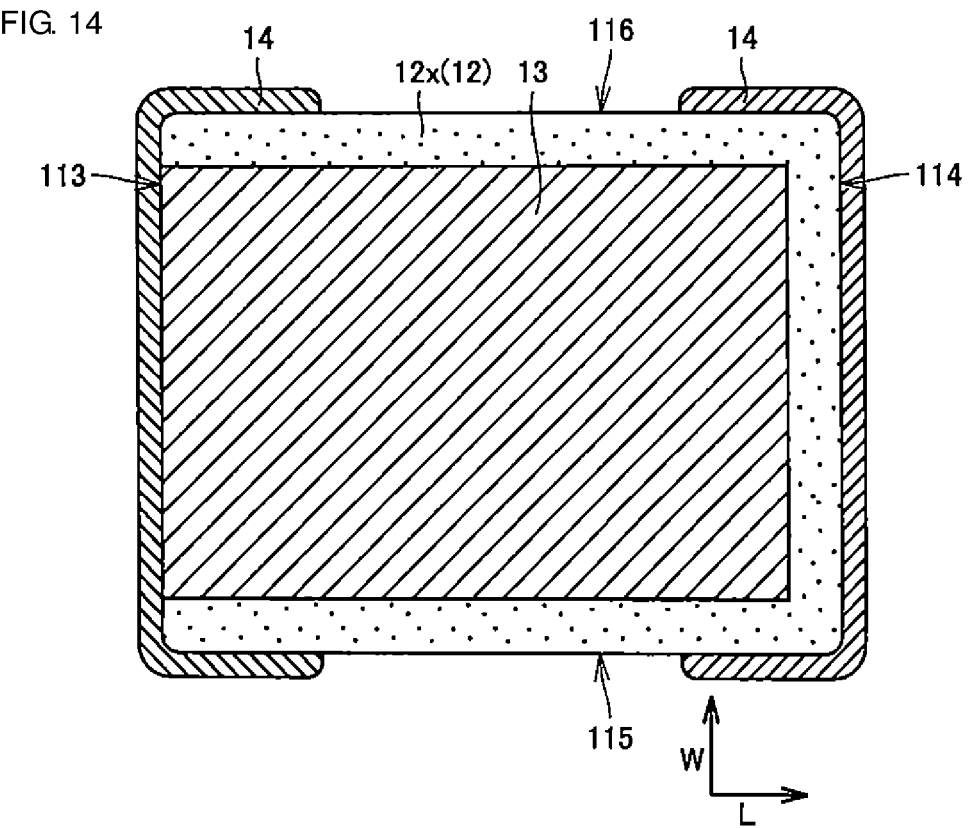

FIG. 10 is an external perspective view of a capacitor 10a according to the second preferred embodiment of the present invention. FIGS. 11 and 12 are sectional views taken along lines XI-XI and XII-XII, respectively, of FIG. 10. FIGS. 13 and 14 are sectional views taken along lines XIII-XIII and XIV-XIV, respectively, of FIG. 11. In FIGS. 10 through 14, the length direction of a body 11 is indicated by L, the width direction thereof is indicated by W, and the height direction thereof is indicated by T.

As shown in FIGS. 10 through 14, the capacitor 10a includes the body 11 and two outer electrodes 14. The body 11 includes a plurality of dielectric layers 12 and a plurality of conductive layers 13 stacked on each other, and includes first and second main surfaces 111 and 112 opposing each other in the stacking direction. The two outer electrodes 14 are disposed on some surfaces of the body 11 and are electrically connected to all the conductive layers 13.

The plurality of dielectric layers 12 include a plurality of first dielectric layers 12x and a second dielectric layer 12y, which are formed from ceramic green sheets made of different compositions, which will be discussed later.

A first outer layer portion $12b_1$ includes a first dielectric layer 12x positioned closest to the first main surface 111 among the plurality of dielectric layers 12. A second outer layer portion $12b_2$ includes an outer portion $12b_{22}$ and an inner portion $12b_{21}$. The outer portion $12b_{22}$ includes a second dielectric layer 12y, which is the dielectric layer positioned closest to the second main surface 112 among the plurality of dielectric layers 12. The inner portion $12b_{21}$ includes the first dielectric layer 12x positioned adjacent to the surface of the outer portion $12b_{22}$ closer to the first main surface 111. The configuration of the first outer layer portion $12b_1$ is not restricted to that discussed above. The first outer layer portion $12b_1$ may include an outer portion including a second dielectric layer 12y positioned closest to the first main surface 111 and an inner portion including a first dielectric layer 12x positioned adjacent to the surface of the outer portion closer to the second main surface 112.

In the inner layer portion 11m, some of the plurality of dielectric layers 12x and all the conductive layers 13 are alternately stacked on each other. That is, the inner layer portion 11m includes all the conductive layers 13. All the conductive layers 13 are preferably rectangular or substantially rectangular, as viewed from above.

In the second preferred embodiment, all the conductive layers 13 preferably are electrically connected to either one of the two outer electrodes 14. Alternatively, at least some of the conductive layers 13 may be electrically connected to one of the two outer electrodes 14. That is, among the plurality of conductive layers 13, there may be some conductive layers 13 that are not electrically connected to any of the two outer electrodes 14.

The two outer electrodes 14 are disposed at both ends of the body 11 in the length direction L. More specifically, one of the two outer electrodes 14 is disposed at one end of the body 11 close to the first end surface 113 in the length direction L, while the other one of the two outer electrodes 14 is disposed at the other end of the body 11 close to the second end surface 114 in the length direction L. In the second preferred embodiment, one of the two outer electrodes 14 extends from the first end surface 113 continuously to the first and second main surfaces 111 and 112 and to the first and second side surfaces 115 and 116. The other one of the two outer electrodes 14 extends from the second end surface 114 continuously to the first and second main surfaces 111 and 112 and to the first and second side surfaces 115 and 116. However, the arrangement of the two outer electrodes 14 is not restricted to that described above. The two outer electrodes 14 may be disposed on some surfaces of the body 11 so that they can be electrically connected to the plurality of conductive layers 13 and so that the capacitor 10a can be mounted.

One of the two outer electrodes 14 is connected to some of the plurality of conductive layers 13 on the first end surface 113, while the other one of the two outer electrodes 14 is connected to the remaining conductive layers 13 on the second end surface 114. The conductive layers 13 connected to the first end surface 113 and the remaining conductive layers 13 connected to the second end surface 114 are alternately stacked on each other such that they face each other with a first dielectric layer 12x therebetween in the inner layer portion 11m.

As shown in FIG. 12, the height $T_1$ of the inner layer portion 11m in the stacking direction of the body 11 is smaller than the width $W_1$ of the inner layer portion 11m where the plurality of conductive layers 13 are positioned in the width direction W of the body 11 in which the first and second side surfaces 115 and 116 are connected to each other with the shortest distance.

The height $h_{22}$ of the outer portion $12b_{22}$ is equal to or greater than the height $h_{21}$ of the inner portion $12b_{21}$. The height $h_{22}$ of the outer portion $12b_{22}$ is preferably about 30 μm or greater, for example, which will be discussed later. The height $h_{21}$ of the inner portion $12b_{21}$ is preferably about 20 μm or greater, for example, which will be discussed later.

The second outer layer portion $12b_2$ is thicker than the first outer layer portion $12b_1$. That is, the height $h_2$ of the second outer layer portion $12b_2$ is greater than the height $h_1$ of the first outer layer portion $12b_1$. The height $h_{21}$ of the inner portion $12b_{21}$ may be equal to or smaller than the height $h_1$ of the first outer layer portion $12b_1$.

It is preferable that, in the width direction W of the body 11, the maximum width of side gaps 12c, which is the distance between each of the first and second side surfaces 115 and 116 and the inner layer portion 11m, be greater than the height $h_1$ of the first outer layer portion $12b_1$. It is also preferable that the average width $((W_0-W_1)/2)$ of the side gaps 12c be greater than the height $h_1$ of the first outer layer portion $12b_1$. It is more preferable that the maximum width or the average width $((W_0-W_1)/2)$ of the side gaps 12c be greater than about 30 μm and smaller than about 90 μm, for example. It is also preferable that the maximum width of the side gaps 12c be greater than the height $h_{21}$ of the inner portion $12b_{21}$.

The configuration of each of the elements defining the capacitor 10a will be described in detail. The dielectric layers 12 each contain a perovskite compound expressed by $ABO_3$ ("A" contains Ba, and "B" contains Ti, and O is oxygen) as a principal component. That is, the plurality of first dielectric layers 12x and the second dielectric layer 12y each contain barium titanate ($BaTiO_3$) as a principal component.

The plurality of dielectric layers 12 each contain Si as a secondary component. Si is contained in the dielectric layers 12 by adding a Si compound, such as glass or $SiO_2$, as a secondary component to a perovskite compound expressed by $ABO_3$ as a principal component. Another compound, such as a Mn compound, an Mg compound, a Co compound, a Ni compound, or a rare earth compound, may be added to a perovskite compound expressed by $ABO_3$.

The composition ratio of Si to Ti of the second dielectric layer 12y defining the outer portion $12b_{22}$ is higher than that of the first dielectric layers 12x included in the inner layer portion 11m, the first dielectric layer 12x defining the first outer layer portion $12b_1$, and the first dielectric layer 12x defining the inner portion $12b_{21}$. The composition ratio of Si and other components to Ti may be represented by a molar ratio. In the following description, the composition ratio will be referred to as the "molar ratio". The molar ratio of Si to Ti of each of the dielectric layers 12 may be measured by using a wavelength-dispersive X-ray spectrometer (WDX).

The molar ratio of Si to Ti of the second dielectric layer 12y defining the outer portion $12b_{22}$ is preferably about 1.3 to 3.0 mol percent (%), for example. If the molar ratio of Si to Ti of the second dielectric layer 12y forming the outer portion $12b_{22}$ is lower than about 1.3 mol % or higher than about 3.0 mol %, the reliability of the outer portion $12b_{22}$ may be impaired.

The molar ratio of Si to Ti of the second dielectric layer 12y defining the outer portion $12b_{22}$ is preferably higher than that of the first dielectric layer 12x forming the inner portion $12b_{21}$ by about 0.4 mol % or higher, and more preferably, by about 0.8 mol % or higher, for example.

The outer portion $12b_{22}$ includes a boundary region 12z adjacent to the inner portion $12b_{21}$ which has a higher content of Si than a central region 12m of the outer portion $12b_{22}$. A surface layer section 12s of the outer portion $12b_{22}$ close to the second main surface 112 also has a higher content of Si than the central region 12m of the outer portion $12b_{22}$. The boundary region 12z and the surface layer section 12s of the outer portion $12b_{22}$ having a high content ratio of Si may be identified by element mapping created by using a field emission wavelength-dispersive X-ray spectrometer (FE-WDX).

A manufacturing method for the capacitor 10a according to the second preferred embodiment of the present invention will be described below with reference to FIGS. 15 through 18.

Figure 15:
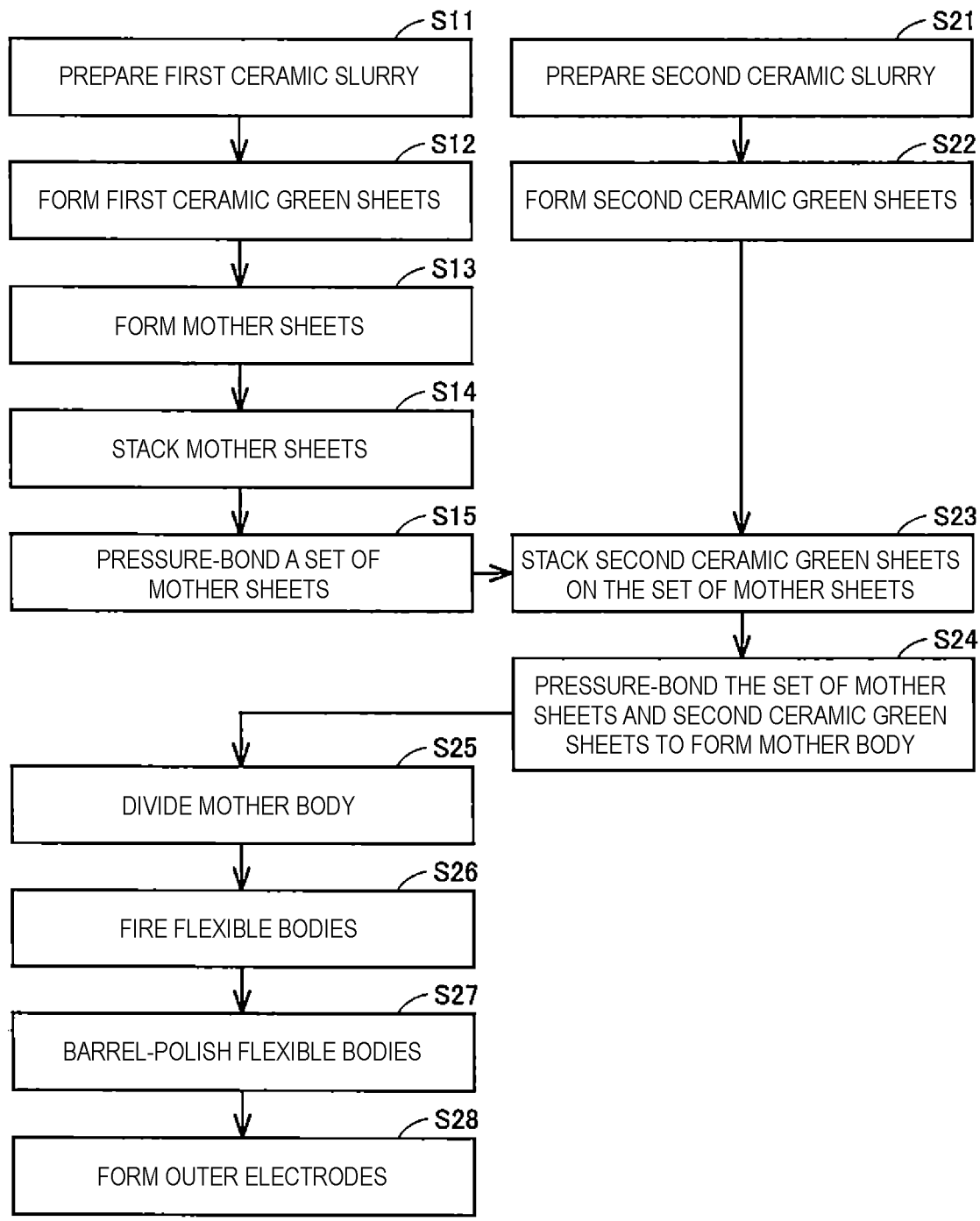
FIG. 15 is a flowchart illustrating a manufacturing method for a multilayer ceramic capacitor according to the second preferred embodiment of the present invention.

FIG. 15 is a flowchart illustrating a non-limiting example of a manufacturing method according to the second preferred embodiment. In this manufacturing method, a plurality of capacitors 10a are mass-produced at one time together in the following manner. Elements which will form a plurality of capacitors 10a are processed together until a halfway point through a manufacturing process so as to fabricate a mother body. Then, the mother body is divided into individual flexible bodies. The individual flexible bodies are then processed, thus manufacturing a plurality of capacitors 10a.

The manufacturing method will be discussed below more specifically with reference to FIG. 15. In step S11, a first ceramic slurry is prepared first. More specifically, a ceramic powder, a binder, and a solvent are mixed at a predetermined mixing ratio so as to form the first ceramic slurry.

Then, in step S12, first ceramic green sheets are formed. More specifically, the first ceramic slurry is formed into a sheet shape on a carrier film by using a die coater, a gravure coater, or a micro gravure coater, thus forming the first ceramic green sheets.

Then, in step S13, mother sheets are formed. More specifically, a conductive paste is printed on each first ceramic green sheet by using screen printing or gravure printing such that a predetermined conductive pattern is formed on the first ceramic green sheet. As a result, a mother sheet, which is a first ceramic green sheet having a predetermined conductive pattern thereon, is formed.

Figure 16:
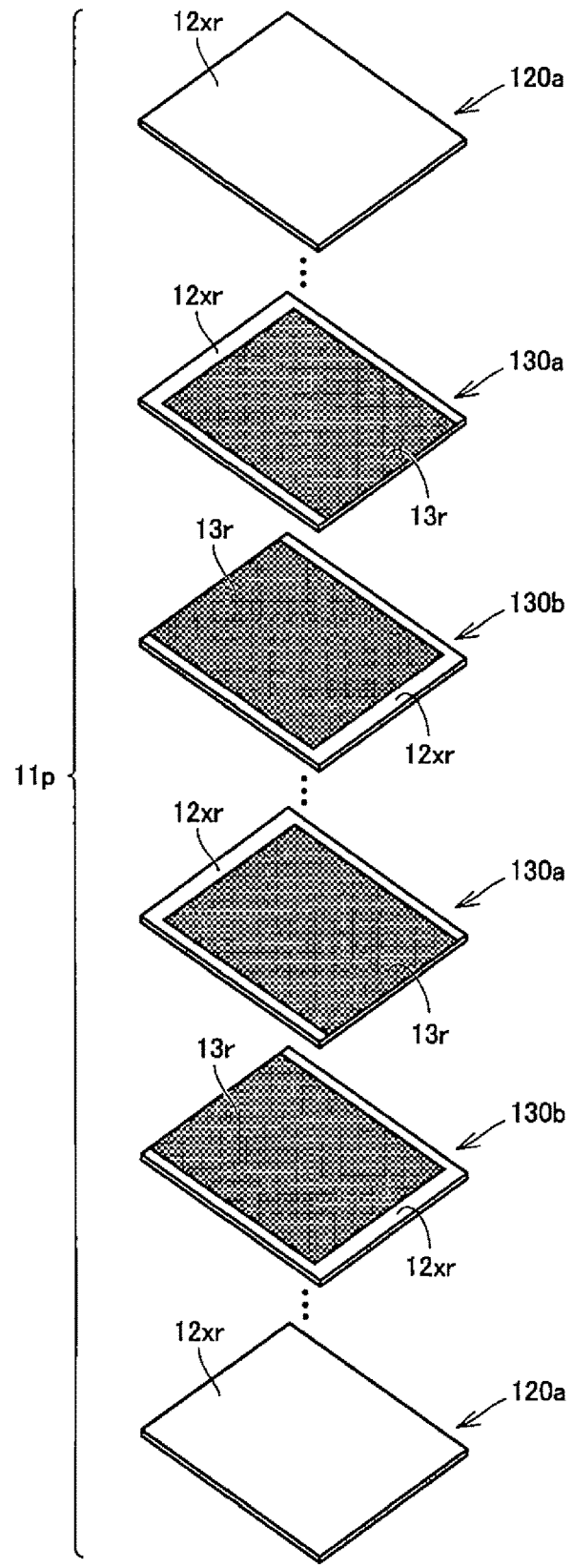
FIG. 16 is an exploded perspective view illustrating the multilayer structure of a set of unit sheets defining a partial body of a multilayer ceramic capacitor of the second preferred embodiment without an outer portion.

Mother sheets formed in step S13 will be discussed below in detail. FIG. 16 is an exploded perspective view illustrating the multilayer structure of a set of unit sheets, which will define a partial body 11p of the capacitor 10a of the second preferred embodiment without the outer portion $12b_{22}$.

As shown in FIG. 16, the partial body 11p includes a set of a plurality of unit sheets 120a, 130a, and 130b which are configured differently. More specifically, the plurality of unit sheets 120a, 130a, and 130b are stacked on each other in a predetermined order and are then pressure-bonded and fired so as to fabricate the partial body 11p.

Each unit sheet 120a is constituted only by a ceramic base member 12xr on which no conductive pattern is formed. The unit sheet 120a defines a first dielectric layer 12x of the first outer layer portion $12b_1$ or the inner portion $12b_{21}$ after the firing step is performed.

The unit sheets 130a and 130b are each constituted by a ceramic base member 12xr on which a conductive pattern 13r having a predetermined shape is provided. The conductive patterns 13r of the unit sheets 130a and 130b define the conductive layers 13 within the inner layer portion 11m after the firing step is performed. The ceramic base members 12xr of the unit sheets 130a and 130b define the first dielectric layers 12x within the inner layer portion 11m after the firing step is performed.

The layout of the mother sheet is as follows. By using each of the unit sheets 130a and 130b shown in FIG. 16 as a unit, a plurality of unit sheets having the same configuration as that of the unit sheet 130a or 130b are two-dimensionally arranged in a matrix.

Since the unit sheets 130a and 130b have the same configuration, unit sheets having the same conductive pattern may be used as a mother sheet. In a step of stacking a set of mother sheets, which will be discussed later, mother sheets having the same conductive pattern are displaced from each other by half pitch, thus obtaining the multilayer structure of the unit sheets 130a and 130b shown in FIG. 16.

As mother sheets, not only mother sheets having the conductive pattern 13r, but also first ceramic green sheets which are formed without being subjected to step S13 are also prepared.

Then, referring back to FIG. 15, in step S14, the mother sheets are stacked. More specifically, by stacking the plurality of mother sheets according to a predetermined rule, the above-described units are positioned within a set of the stacked mother sheets so that the multilayer structure shown in FIG. 16 can be obtained.

Figure 17:
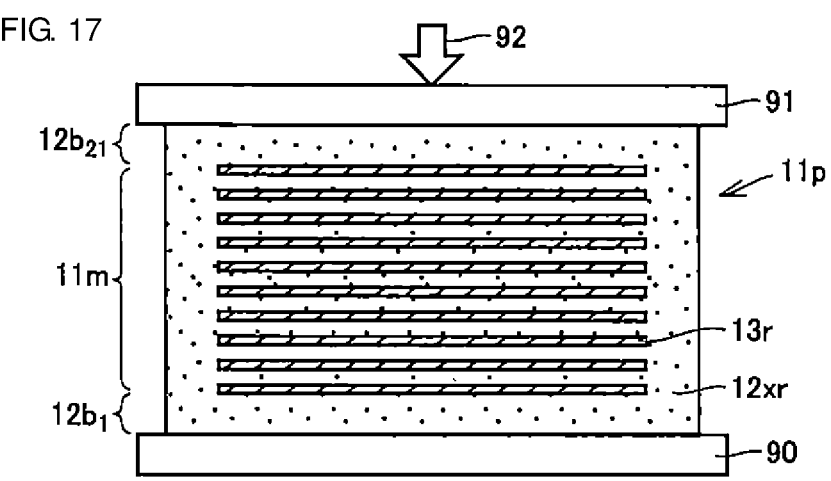
FIG. 17 is a sectional view illustrating a state in which a set of mother sheets are being pressure-bonded.

Then, in step S15, the set of stacked mother sheets is pressure-bonded. FIG. 17 is a sectional view illustrating a state in which the set of mother sheets are being pressure-bonded. In FIG. 17, the set of mother sheets corresponding to only one partial body 11p is shown. In the second preferred embodiment, as shown in FIG. 17, a plurality of mother sheets defining the first outer layer portion $12b_1$, a plurality of mother sheets defining the inner layer portion 11m, and a plurality of mother sheets defining the inner portion $12b_{21}$ are stacked on each other in this order so as to form the set of mother sheets.

A flat die 91 is pressed against the mother sheets defining the inner portion $12b_{21}$ along the stacking direction, as indicated by an arrow 92 in FIG. 17, thus pressure-bonding the set of mother sheets placed on a base 90.

In step S21, second ceramic slurry is prepared. More specifically, a ceramic powder, a binder, and a solvent are mixed at a predetermined mixing ratio so as to form the second ceramic slurry. The amount of Si contained in the second ceramic slurry is greater than that in the first ceramic slurry.

Then, in step S22, second ceramic green sheets are formed. More specifically, the second ceramic slurry is formed into a sheet shape on a carrier film by using a die coater, a gravure coater, or a micro gravure coater, thus forming a plurality of second ceramic green sheets.

Then, in step S23, the plurality of second ceramic green sheets are stacked on the set of mother sheets pressure-bonded in step S15. More specifically, the plurality of second ceramic green sheets uniquely made of a ceramic base member 12yr defining the second dielectric layer 12y of the outer portion $12b_{22}$ are stacked on the mother sheets forming the inner portion $12b_{21}$. Instead of stacking the plurality of second ceramic green sheets uniquely made of a ceramic base member 12yr, a paste containing the second ceramic slurry may be applied onto the mother sheets defining the inner portion $12b_{21}$.

Figure 18:
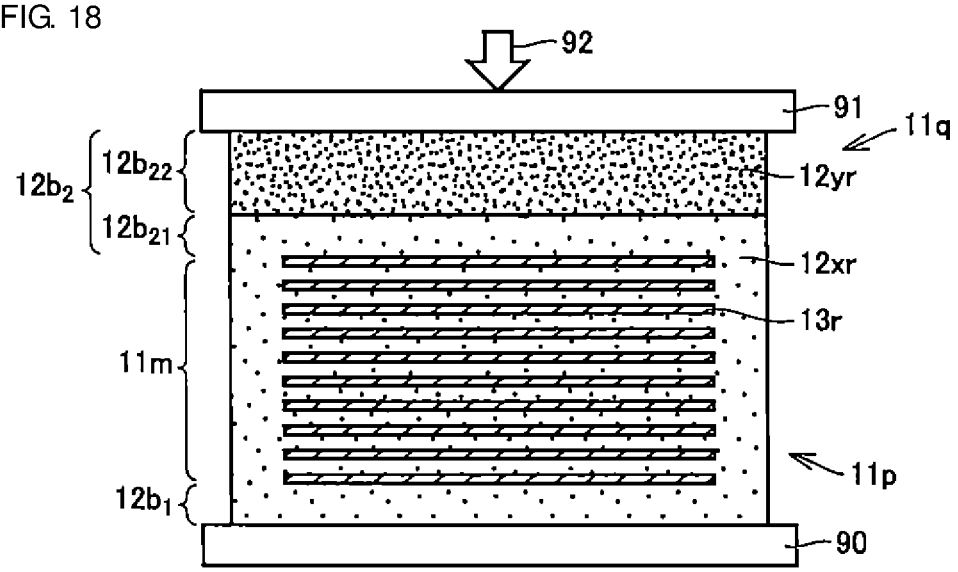
FIG. 18 is a sectional view illustrating a state in which a set of pressure-bonded mother sheets and a plurality of second ceramic green sheets are being pressure-bonded.

Then, in step S24, the set of mother sheets pressure-bonded in step S15 and the plurality of second ceramic green sheets are being pressure-bonded. FIG. 18 is a sectional view illustrating a state in which the set of mother sheets and the plurality of second ceramic green sheets are being pressure-bonded. In FIG. 18, the set of mother sheets and the plurality of second ceramic green sheets corresponding to only one flexible body 11q are shown. In FIG. 18, a flat die 91 is pressed against the mother sheets defining the outer portion $12b_{22}$ along the stacking direction of the set of mother sheets, as indicated by an arrow 92, thus pressure-bonding the set of mother sheets and the plurality of second ceramic green sheets. As a result, a mother body is fabricated.

Then, in step S25, the mother body is divided. More specifically, the mother body is press-cut or cut with a dicing machine in a matrix into the flexible bodies $11q$.

Then, in step S26, the flexible bodies $11q$ are fired. More specifically, the flexible bodies $11q$ are heated to a predetermined temperature so as to fire the ceramic dielectric material and the conductive material. The firing temperature is set suitably in accordance with the type of ceramic dielectric material and the type of conductive material, and may be set within a range of about 900° C. to about 1300° C., for example.

Then, in step S27, the flexible bodies $11q$ are barrel-polished. More specifically, the flexible bodies $11q$ subjected to firing are sealed within a small box called a barrel, together with media balls having a higher hardness than the ceramic material. Then, by rotating the barrel, the flexible bodies $11q$ are polished. By performing this barrel-polishing, the outer surfaces (in particular, corners and ridges) of the flexible bodies $11q$ are curved and rounded. As a result, the body 11 is formed.

Then, in step S28, outer electrodes are formed. More specifically, a conductive paste is applied to an end portion including the first end surface 113 and an end portion including the second end surface 114 of the body 11 so as to form a metal film, and then, the metal film is fired. Then, the metal film is sequentially Ni-plated and Sn-plated. As a result, the two outer electrodes 14 are formed on the outer surfaces of the body 11.

Through the above-described series of steps, the capacitor $10a$ configured as shown in FIGS. 10 through 14 is manufactured.

In the capacitor $10a$ of the second preferred embodiment, the molar ratio of Si to Ti of the second dielectric layer $12y$ defining the outer portion $12b_{22}$ is higher than that of the first dielectric layers $12x$ included in the inner layer portion $11m$ and the first dielectric layer $12x$ defining the inner portion $12b_{21}$. That is, the outer portion $12b_{22}$ has a higher content of Si than the inner portion $12b_{21}$. In a firing step, the coefficient of thermal contraction of a dielectric layer having a higher content of Si is higher. Accordingly, in the firing step, the coefficient of thermal contraction of the outer portion $12b_{22}$ is higher than that of the inner portion $12b_{21}$. Thus, the coefficient of thermal contraction of the outer portion $12b_{22}$ is closer to that of the conductive layers 13 of the inner layer portion $11m$.

In the capacitor $10a$, it is possible to reduce an internal stress which is produced in the firing step due to the difference in the coefficient of thermal contraction between the dielectric layers and the conductive layers and which acts on the boundary between the inner layer portion $11m$ and the second outer layer portion $12b_2$. Thus, the occurrence of cracks (delamination) at the boundary between the inner layer portion $11m$ and the second outer layer portion $12b_2$ is significantly reduced or prevented.

The molar ratio of Si to Ti of the second dielectric layer $12y$ defining the outer portion $12b_{22}$ preferably is higher than that of the first dielectric layer $12x$ defining the inner portion $12b_{21}$ by about 0.4 mol % or higher, for example. With this configuration, the occurrence of cracks (delamination) at the boundary between the inner layer portion $11m$ and the second outer layer portion $12b_2$ is effectively significantly reduced or prevented. The molar ratio of Si to Ti of the outer portion $12b_{22}$ is preferably higher than that of the inner portion $12b_{21}$ by about 0.8 mol % or higher, for example. With this configuration, the occurrence of cracks at the boundary between the inner layer portion $11m$ and the second outer layer portion $12b_2$ can be significantly reduced or prevented even more effectively.

As described above, the height of the outer portion $12b_{22}$ is equal to or greater than that of the inner portion $12b_{21}$. With this configuration, the stress relaxing effect exhibited by the thermal contraction of the outer portion $12b_{22}$ is more likely to be produced at the boundary between the inner layer portion $11m$ and the second outer layer portion $12b_2$.

The height $h_{22}$ of the outer portion $12b_{22}$ preferably is about 30 μm or greater, for example. With this configuration, it is possible to secure a sufficient contraction force which acts on the inner portion $12b_{21}$ by the thermal contraction of the outer portion $12b_{22}$.

The height $h_{21}$ of the inner portion $12b_{21}$ preferably is about 20 μm or greater, for example. With this configuration, the diffusion of Si contained in the outer portion $12b_{22}$ into the inner layer portion $11m$ is significantly reduced or prevented. If the content ratio of Si in the inner layer portion $11m$ becomes too high, the grain growth of ceramic particles in the first dielectric layers $12x$ included in the inner layer portion $11m$ accelerates excessively in the firing step, thus reducing the withstand voltage characteristics of the first dielectric layers $12x$. As a result, the inner layer portion $11m$ is more likely to be short-circuited. However, by setting the height $h_{21}$ of the inner portion $12b_{21}$ to be about 20 μm or greater, for example, the withstand voltage characteristics of the first dielectric layers $12x$ included in the inner layer portion $11m$ are maintained, and thus, the occurrence of short-circuiting of the inner layer portion $11m$ is significantly reduced or prevented.

As described above, the height $h_{21}$ of the inner portion $12b_{21}$ may be equal to or smaller than the height $h_1$ of the first outer layer portion $12b_1$. Even if the inner portion $12b_{21}$ is thin, the presence of the outer portion $12b_{22}$ makes it possible to significantly reduce or prevent the occurrence of short-circuiting in the inner layer portion $11m$ caused by the entry of moisture into the inner layer portion $11m$ via the inner portion $12b_{21}$.

As described above, the maximum width of the side gaps $12c$ is preferably greater than the height $h_1$ of the first outer layer portion $12b_1$. If the first outer layer portion $12b_1$ is thin, it is possible to reduce an internal stress which is produced during the firing step due to the difference in the coefficient of thermal contraction between the dielectric layers and the conductive layers and which acts on the boundary between the inner layer portion $11m$ and the first outer layer portion $12b_1$. Thus, the occurrence of cracks (delamination) at the boundary between the inner layer portion $11m$ and the first outer layer portion $12b_1$ is significantly reduced or prevented.

If the maximum width of the side gaps $12c$ is set to be large, when pressure-bonding a set of mother sheets, the pressure is more likely to be applied to the plurality of first dielectric layers $12x$ positioned in the side gaps $12c$, thus enhancing the adherence of the first dielectric layers $12x$ in the side gaps $12c$. As a result, it is possible to significantly reduce or prevent the occurrence of cracks (delamination) in the first dielectric layers $12x$ positioned in the side gaps $12c$.

As described above, the average width $((W_0-W_1)/2)$ of the side gaps $12c$ is preferably greater than the height $h_1$ of the first outer layer portion $12b_1$. The half of the total width of the two adjacent side gaps $12c$ of two adjacent bodies 11 divided from the mother body corresponds to the average width $((W_0-W_1)/2)$. Accordingly, if the average width $((W_0-W_1)/2)$ of the side gaps $12c$ is set to be greater than the height $h_1$ of the first outer layer portion $12b_1$, when pressure-bonding a set of mother sheets, the pressure is more likely to be applied to the plurality of first dielectric layers $12x$ positioned in the side gaps $12c$, thus enhancing the adherence of the first dielectric layers $12x$ positioned in the side gaps $12c$. As a result, it is possible to significantly reduce or prevent the occurrence of cracks (delamination) in the first dielectric layers $12x$ positioned in the side gaps $12c$. That is, even if there is a difference between the width of the side gap $12c$ close to the first side surface $115$ and that close to the second side surface $116$, both of the effect of significantly reducing or preventing the occurrence of cracks (delamination) and the effect of significantly reducing or preventing the occurrence of short-circuiting in the inner layer portion $11m$ are reliably achieved.

As described above, the maximum width of the side gaps $12c$ is preferably greater than the height $h_{21}$ of the inner portion $12b_{21}$. If the inner portion $12b_{21}$ is thin, a contraction force exhibited by the thermal contraction of the outer portion $12b_{22}$ is likely to act on the inner portion $12b_{21}$. It is thus possible to effectively reduce an internal stress which is produced during the firing step due to the difference in the coefficient of thermal contraction between the dielectric layers and the conductive layers and which acts on the boundary between the inner layer portion $11m$ and the inner portion $12b_{21}$. As a result, the occurrence of cracks (delamination) at the boundary between the inner layer portion $11m$ and the second outer layer portion $12b_2$ is significantly reduced or prevented.

As described above, the maximum width or the average width $((W_0-W_1)/2)$ of the side gaps $12c$ is more preferably greater than about 30 μm and smaller than about 90 μm, for example. If the maximum width or the average width $((W_0-W_1)/2)$ of the side gaps $12c$ is greater than about 30 μm, for example, the occurrence of cracks (delamination) at the boundary between the inner layer portion $11m$ and the inner portion $12b_{21}$ is reliably significantly reduced or prevented. If the maximum width or the average width $((W_0-W_1)/2)$ of the side gaps $12c$ is equal to or greater than about 90 μm, the electrostatic capacitance of the capacitor $10$ becomes too small. That is, by setting the maximum width or the average width $((W_0-W_1)/2)$ of the side gaps $12c$ to be smaller than about 90 μm, for example, a sufficient electrostatic capacitance of the capacitor $10a$ is secured.

As described above, since each of the plurality of first dielectric layers $12x$ and the second dielectric layer $12y$ contains barium titanate as a principal component, chemical bonding at the interface between the inner portion $12b_{21}$ and the outer portion $12b_{22}$ is strengthened, thus enhancing the adherence therebetween. As a result, it is possible to significantly reduce or prevent the occurrence of cracks (delamination) at the boundary region in the outer portion $12b_{22}$.

As described above, the boundary region $12z$ in the outer portion $12b_{22}$ has a higher content of Si than the central region $12m$ of the outer portion $12b_{22}$ since Si is concentrated in this boundary region $12z$ after moving from the outer portion $12b_{22}$ or the inner portion $12b_{21}$. The surface layer section $12s$ of the outer portion $12b_{22}$ close to the second main surface $112$ also has a higher content of Si than the central region $12m$ of the outer portion $12b_{22}$.

A description will be given below of how to set the content ratio of Si of the boundary region $12z$ in the outer portion $12b_{22}$ and the surface layer section $12s$ of the outer portion $12b_{22}$ to be higher than that of the central region $12m$ of the outer portion $12b_{22}$. The firing step for the capacitor $10a$ is performed at a temperature and in a gaseous atmosphere in which Si segregates from grain boundaries of ceramic particles. Then, in the outer portion $12b_{22}$ containing a greater amount of Si, the grain growth of ceramic particles is encouraged, and Si segregates from the grain boundaries of coarsened ceramic particles. Segregated Si moves along the grain boundaries of the ceramic particles and concentrates toward the boundary region $12z$ in the outer portion $12b_{22}$ and the surface layer section $12s$ of the outer portion $12b_{22}$. As a result, the content ratio of Si of the boundary region $12z$ and that of the surface layer section $12s$ of the outer portion $12b_{22}$ become higher than that of the central region $12m$ of the outer portion $12b_{22}$.

The content ratio of Si of the boundary region $12z$ in the outer portion $12b_{22}$ is higher than that of the central region $12m$ of the outer portion $12b_{22}$, thus improving the adhesion force between the outer portion $12b_{22}$ and the inner portion $12b_{21}$. The reason for this may be as follows. Si which has moved along the grain boundaries of the ceramic particles as described above fills many small gaps at the interface between the outer portion $12b_{22}$ and the inner portion $12b_{21}$ so as to bond them each other. Accordingly, by separately forming the outer portion $12b_{22}$ and the inner portion $12b_{21}$, small gaps are created at the interface between the outer portion $12b_{22}$ and the inner portion $12b_{21}$. This encourages the concentration of segregated Si in the boundary region $12z$, thus improving the adhesion force between the outer portion $12b_{22}$ and the inner portion $12b_{21}$.

The content ratio of Si of the surface layer section $12s$ of the outer portion $12b_{22}$ close to the second main surface $112$ is higher than that of the central region $12m$ of the outer portion $12b_{22}$, thus significantly reducing or preventing a decrease in the mechanical strength of the body $11$ when forming the outer electrodes $14$. The reason for this is as follows. In the formation of the outer electrodes $14$, if glass components contained in the outer electrodes $14$ react with the ceramic dielectric material of the body $11$, the mechanical strength of the body $11$ is decreased. In this case, if an external force is applied to the capacitor $10a$ while the capacitor $10a$ is being mounted or after it has been mounted, cracks are likely to occur in the body $11$ starting from the end of the contact area with the outer electrode $14$ close to the center of the body $11$. However, if the content ratio of Si of the outer portion $12b_{22}$ is high, the reaction of glass components contained in the outer electrodes $14$ with the ceramic dielectric material of the body $11$ can be significantly reduced or prevented. As a result, it is possible to significantly reduce or prevent a decrease in the mechanical strength of the body $11$ when forming the outer electrodes $14$.

In each of the plurality of dielectric layers $12$, if a rare earth compound is contained in a perovskite compound expressed by $ABO_3$, which is a principal component, the molar ratio of a rare earth element to Ti of the first dielectric layers $12x$ included in the inner layer portion $11m$ and the first dielectric layer $12x$ defining the inner portion $12b_{21}$ is preferably higher than that of the second dielectric layer $12y$ forming the outer portion $12b_{22}$. That is, the inner layer portion $11m$ and the inner portion $12b_{21}$ preferably contain a greater amount of rare earth element than the outer portion $12b_{22}$.

As a rare earth element, Dy, Gd, Y, or La may be added for improving the functions of the capacitor $10a$. More specifically, by adding a rare earth element, it is possible to stabilize the capacitance temperature characteristics and to prolong the life of the capacitor $10a$ by maintaining the insulation resistance (IR) value even under a high-temperature load.

A rare earth element is likely to concentrate in a grain boundary of ceramic particles or a segregation layer and also to elute to water-soluble flux. Accordingly, ceramic components containing a rare earth element may elute to an organic acid, such as adipic acid, contained in water-soluble flux used for soldering when mounting the capacitor 10a. In this case, cracks may occur in the outer layer portion $12b_2$ of the body 11 which is embrittled as a result of the eluting of ceramic components.

Accordingly, the molar ratio of a rare earth element to Ti of the first dielectric layers 12x included in the inner layer portion 11m and the first dielectric layer 12x forming the inner portion $12b_{21}$ is preferably about 0.3 mol % or higher, and the molar ratio of a rare earth element to Ti of the second dielectric layer 12y forming the outer portion $12b_{22}$ is preferably lower than about 0.3 mol %, for example.

By setting the molar ratio of a rare earth element to Ti of the first dielectric layers 12x included in the inner layer portion 11m to be about 0.3 mol % or higher, for example, it is possible to stabilize the capacitance temperature characteristics and to prolong the life of the capacitor 10a by maintaining the insulation resistance (IR) value even under a high-temperature load.

By setting the molar ratio of a rare earth element to Ti of the second dielectric layer 12y defining the outer portion $12b_{22}$ to be lower than about 0.3 mol %, for example, it is possible to significantly reduce or prevent the occurrence of cracks in the outer portion $12b_{22}$ caused by the embrittlement of the outer portion $12b_{22}$ as a result of the eluting of ceramic components from the outer portion $12b_{22}$. These features and advantages have been validated, as a result of conducting experiments by changing the content of Dy used as a rare earth element. Advantages obtained by the use of Gd, Y, or La instead of Dy have also been validated.

In each of the plurality of dielectric layers 12, if a Mn compound is contained in a perovskite compound expressed by $ABO_3$, which is a principal component, the molar ratio of a Mn compound to Ti of the first dielectric layers 12x included in the inner layer portion 11m, the first dielectric layer 12x forming the first outer layer portion $12b_1$, and the first dielectric layer 12x defining the inner portion $12b_{21}$ is preferably higher than that of the second dielectric layer 12y defining the outer portion $12b_{22}$. That is, the inner layer portion 11m and the inner portion $12b_{21}$ preferably contain a greater amount of Mn than the outer portion $12b_{22}$.

The color of a dielectric layer containing a smaller amount of Mn is brighter than that containing a greater amount of Mn. Accordingly, the color of the outer portion $12b_{22}$ is brighter than that of the inner layer portion 11m, the first outer layer portion $12b_1$, and the inner portion $12b_{21}$, which contain a greater amount of Mn. It is thus easy to visually distinguish the first and second main surfaces 111 and 112 of the capacitor 10a from each other.

When observing the capacitor 10a with an imaging camera, the orientations of the first and second main surfaces 111 and 112 of the capacitor 10a can be identified. Thus, when mounting the capacitor 10a, the orientation of the capacitor 10a can be automatically set so that the second main surface 112 will be a mounting surface.

For example, the molar ratio of Mn to Ti of the first dielectric layers 12x included in the inner layer portion 11m, the first dielectric layer 12x defining the first outer layer portion $12b_1$, and the first dielectric layer 12x defining the inner portion $12b_{21}$ is preferably about 0.08 mol % or higher, and the molar ratio of Mn to Ti of the second dielectric layer 12y defining the outer portion $12b_{22}$ is preferably lower than about 0.08 mol %, for example. These features and advantages have been validated as a result of conducting experiments by changing the content of Mn.

A capacitor mount body having the capacitor 10a of the second preferred embodiment mounted thereon will be described below with reference to FIG. 19.

Figure 19:
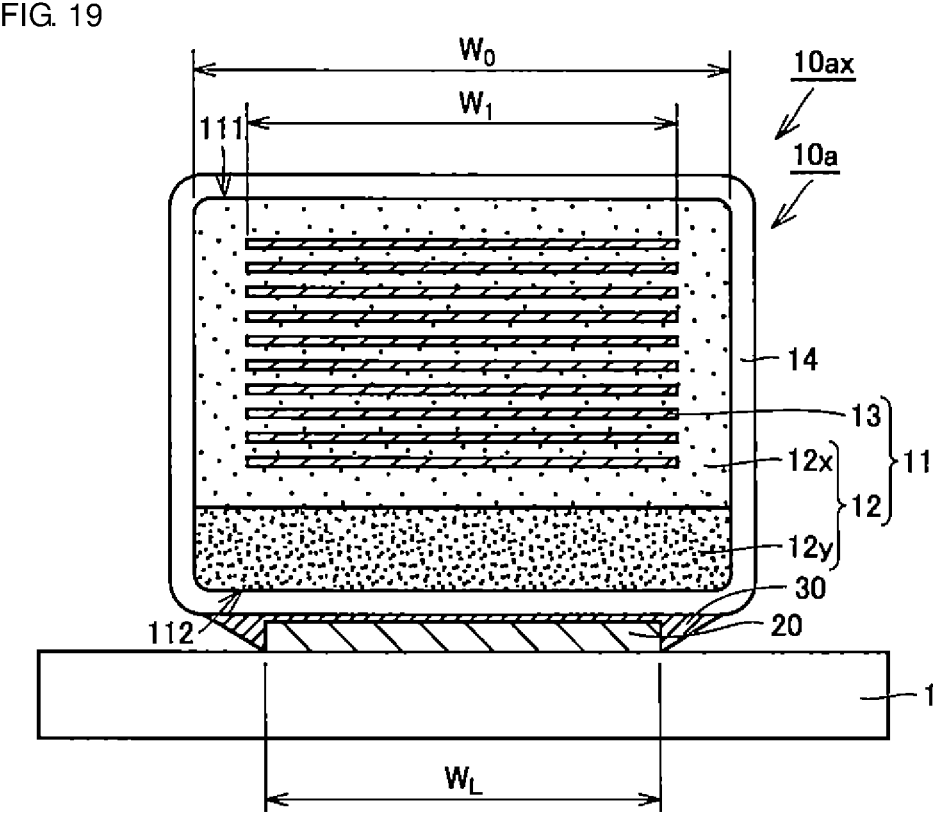
FIG. 19 is a sectional view illustrating the configuration of a multilayer ceramic capacitor mount body according to the second preferred embodiment of the present invention.

FIG. 19 is a sectional view illustrating a capacitor mount body 10ax of the second preferred embodiment. The capacitor mount body 10ax includes the capacitor 10a and a substrate 1, such as a circuit board, used to mount the capacitor 10a thereon. The capacitor 10a is mounted on the substrate 1 such that the second main surface 112 faces the substrate 1.

The configuration of the capacitor mount body 10ax will be discussed more specifically. A pair of lands 20 is disposed on the surface of the substrate 1 such that the lands 20 are spaced apart from each other. The two outer electrodes of the capacitor 10a and the two lands 20 are electrically connected to each other by solder 30, which is a bonding medium. The bonding medium is not restricted to solder, and any bonding material may be used as long as it is able to mechanically and electrically connect the two outer electrodes 14 and the two lands 20.

The width $W_L$ of the two lands 20 is smaller than the width $W_0$ of the body 11. The width $W_L$ of the two lands 20 is preferably smaller than the width $W_1$ of the inner layer portion 11m. By setting the width $W_L$ of the two lands 20 to be smaller than the width $W_0$ of the body 11, the two outer electrodes 14 are subjected to a compressive stress applied from the solder 30 in the width direction W of the body 11. This compressive stress further acts on the inner portion $12b_{21}$ via the outer portion $12b_{22}$. Accordingly, the internal stress acting on the boundary between the inner layer portion 11m and the second outer layer portion $12b_2$ is relaxed, thus significantly reducing or preventing the occurrence of cracks (delamination) at this boundary.

If the width $W_L$ of the two lands 20 is smaller than the width $W_1$ of the inner layer portion 11m, the compressive stress acting on the inner portion $12b_{21}$ via the outer portion $12b_{22}$ is increased. Accordingly, the internal stress acting on the boundary between the inner layer portion 11m and the second outer layer portion $12b_2$ is further relaxed, thus further significantly reducing or preventing the occurrence of cracks (delamination) at this boundary.

A capacitor according to a third preferred embodiment of the present invention will be described below. The capacitor of the third preferred embodiment is different from that of the second preferred embodiment only in the configuration of the boundary region in the outer portion. Thus, the configurations of the other elements will not be explained.

Third Preferred Embodiment

The configuration of the boundary region of the outer portion $12b_{22}$ with the inner portion $12b_{21}$ of the body 11 of the capacitor is preferably implemented by a pressure-bonding method for a set of mother sheets. Accordingly, the pressure-bonding method for a set of mother sheets in the third preferred embodiment will first be described below.

Figure 20:
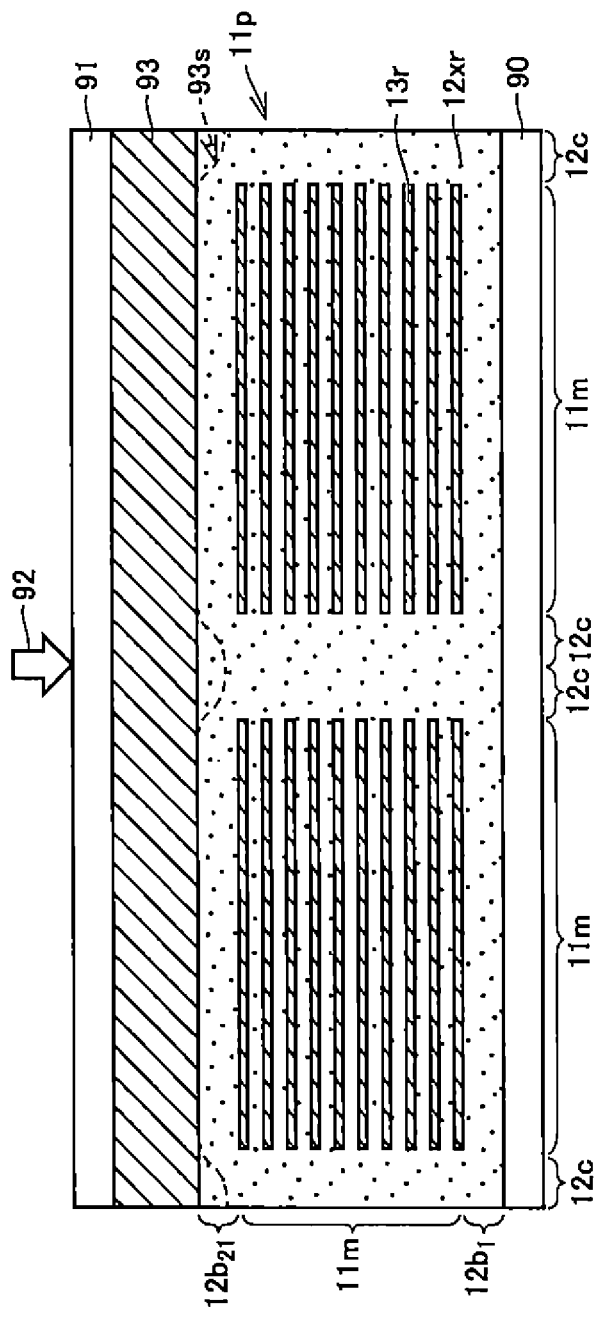
FIG. 20 is a sectional view illustrating a state in which a set of mother sheets defining a multilayer ceramic capacitor according to a third preferred embodiment of the present invention are being pressure-bonded.

FIG. 20 is a sectional view illustrating a state in which a set of mother sheets defining the capacitor in the third preferred embodiment are being pressure-bonded. The set of mother sheets shown in FIG. 20 is that as viewed from the same cross section as that shown in FIG. 17. In FIG. 20, the set of mother sheets corresponding to only two partial bodies 11p is shown.

As shown in FIG. 20, in the third preferred embodiment, a plurality of mother sheets defining the first outer layer portion $12b_1$, a plurality of mother sheets defining the inner layer portion 11m, and a plurality of mother sheets defining the inner portion $12b_{21}$ are stacked on each other in this order so as to form a set of mother sheets.

A flat die 91 and a rubber 93 attached to the bottom surface of the flat die 91 are pressed against the mother sheets defining the inner portion $12b_{21}$ along the stacking direction, as indicated by an arrow 92 in FIG. 20, thus pressure-bonding the set of mother sheets placed on a base 90.

In the set of mother sheets, the stacking density of the mother sheets defining the inner layer portion 11m is higher than that of the mother sheets forming the side gaps 12c. Accordingly, as indicated by the dotted lines 93s in FIG. 20, the rubber 93 pressed against the set of mother sheets is deformed and projected downward from positions corresponding to the inner layer portion 11m toward positions corresponding to the side gaps 12c. This causes the mother sheets at the positions corresponding to the side gaps 12c to be pressure-bonded to each other and to adhere to each other.

Figure 21:
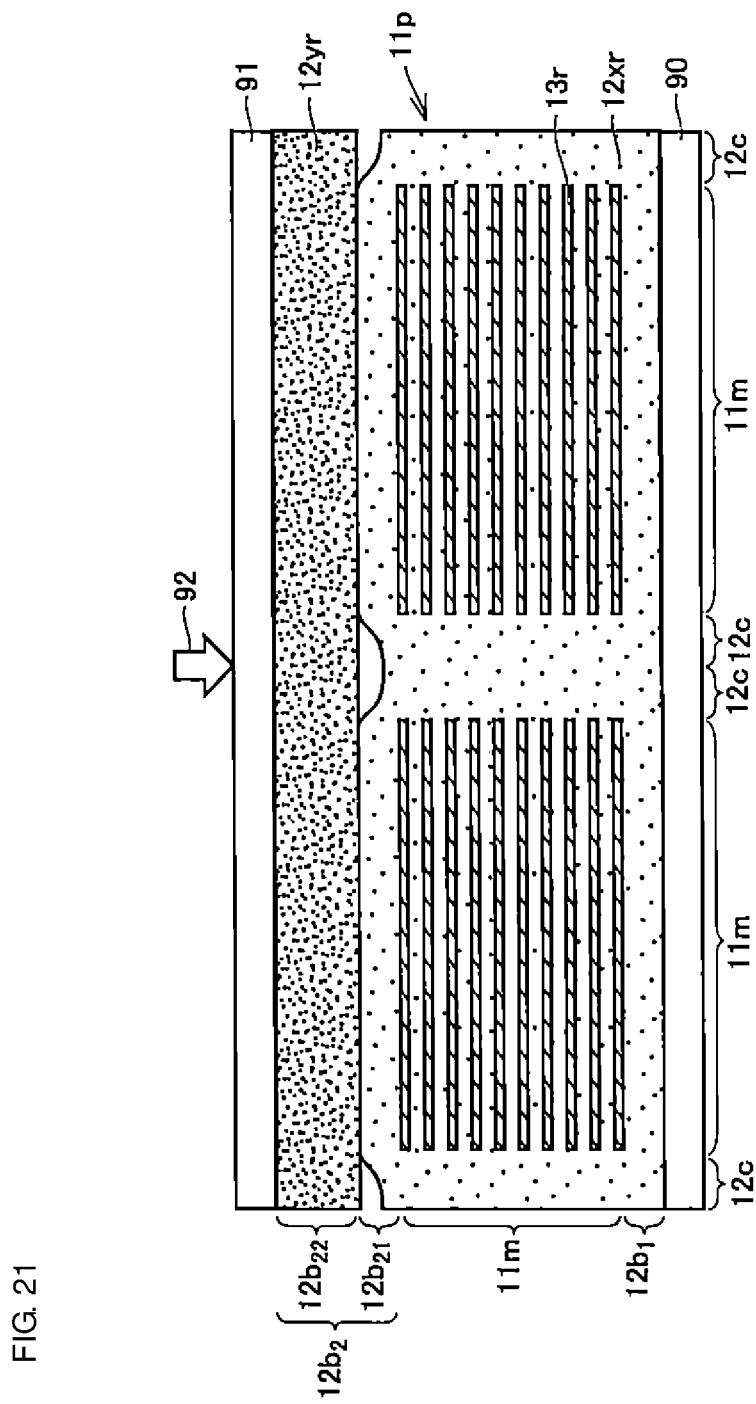
FIG. 21 is a sectional view illustrating a state in which a set of pressure-bonded mother sheets and a plurality of second ceramic green sheets are being pressure-bonded.

FIG. 21 is a sectional view illustrating a state in which the set of pressure-bonded mother sheets and a plurality of second ceramic green sheets are being pressure-bonded. In FIG. 21, the set of mother sheets corresponding to only two partial bodies 11q is shown. The flat die 91 is pressed against the mother sheets forming the outer portion $12b_{22}$ along the stacking direction, as indicated by the arrow 92, thus pressure-bonding the set of mother sheets and the plurality of second ceramic green sheets. As a result, a mother body is fabricated.

Figure 22:
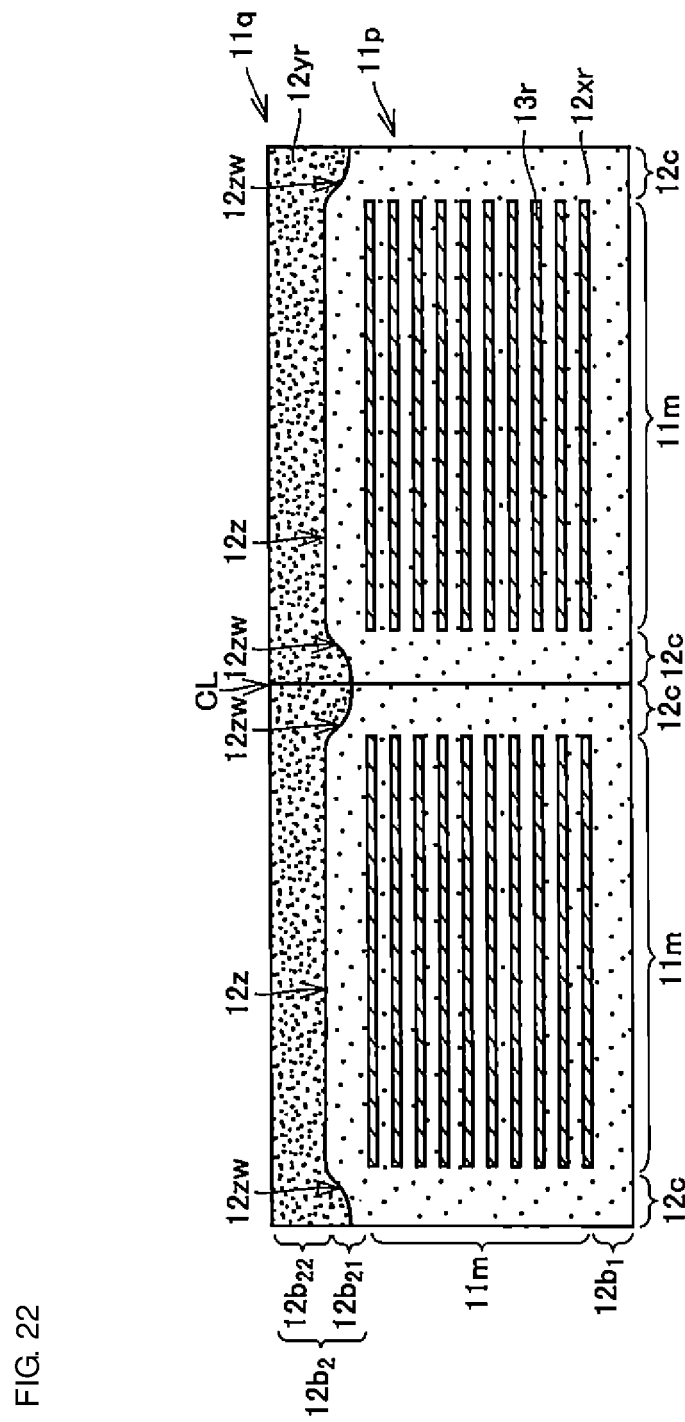
FIG. 22 is a sectional view illustrating a state in which a mother body is divided.

FIG. 22 is a sectional view illustrating a state in which the mother body is divided. In FIG. 22, the mother body corresponding to only two partial bodies 11q is shown. As shown in FIG. 22, the second ceramic green sheets are deformed from positions corresponding to the inner layer portion 11m toward positions corresponding to the side gaps 12c in accordance with the configuration of the top surface of the set of pressure-bonded mother sheets, and are projected downward at the positions corresponding to the side gaps 12c toward the center of the flexible body 11p in the stacking direction.

Accordingly, the boundary region 12z at the side gaps 12c includes bent portions 12zw which incline toward the center of the flexible body 11q in the stacking direction.

By dividing the mother body on a cut line CL, a plurality of flexible bodies 11q are obtained. The subsequent steps are similar to those of the manufacturing method for the capacitor 10a discussed in the second preferred embodiment.

In the capacitor of the third preferred embodiment, the adherence between the first dielectric layers 12x positioned in the side gaps 12c is enhanced. As a result, it is possible to significantly reduce or prevent the occurrence of cracks (delamination) in the first dielectric layers 12x positioned in the side gaps 12c.

Since the boundary region 12z positioned in the side gaps 12c includes bent portions 12zw, the outer portion $12b_{22}$ clamps the inner portion $12b_{21}$ therebetween via a pair of bent portions 12zw. Accordingly, a contraction force exhibited by the thermal contraction of the outer portion $12b_{22}$ is effectively applied to the inner portion $12b_{21}$. It is thus possible to effectively reduce an internal stress which is produced during the firing step due to the difference in the coefficient of thermal contraction between the dielectric layers and the conductive layers and which acts on the boundary between the inner layer portion 11m and the second outer layer portion $12b_2$. As a result, the occurrence of cracks (delamination) at the boundary between the inner layer portion 11m and the second outer layer portion $12b_2$ is significantly reduced or prevented.

A description will be given below of an experiment for examining how the height and the width of the body of a capacitor and the height and the width of an inner layer portion influence the occurrence of cracks during a firing step for the capacitor.

Experiment

In this experiment, a total of four types of capacitors according to comparative examples 1 through 3 and example 1 were fabricated. Conditions (design values) applied to all the four types of capacitors will be discussed first.

For distinguishing the main surfaces and side surfaces of the body of each capacitor from each other from the outer configuration of the body, the height and the width of the body were set to be different by about 20% or higher. The length of the body was about 1.65 mm and the length of the opposing conductive layers (the length of the inner layer portion) was about 1.47 mm.

The conditions set for the four types of capacitors according to comparative examples 1 through 3 and example 1 are indicated in the Table below.

For the evaluation concerning the occurrence of cracks during the firing of the capacitors, ten samples of each of the four types of capacitors were prepared. If the occurrence of cracks was observed in even one of the ten samples of each type of capacitor, the evaluation concerning the occurrence of cracks in this type of capacitor was determined to be "BAD", and if the occurrence of cracks was observed in none of the ten samples, the evaluation concerning the occurrence of cracks in this type of capacitor was determined to be "GOOD". The occurrence of cracks was checked by exposing a WT cross section passing through the center of the body of a capacitor by polishing the body and by observing the exposed WT cross section with an optical microscope.

TABLE

|  | Example 1 | Comparative example 1 | Comparative example 2 | Comparative example 3 |
| --- | --- | --- | --- | --- |
| Width of body (µm) | 0.91 | 0.91 | 0.95 | 0.95 |
| Height of body (µm) | 0.71 | 0.71 | 1.1 | 1.1 |
| Width of inner layer portion (µm) | 0.81 | 0.57 | 0.85 | 0.85 |
| Height of inner layer portion (µm) | 0.58 | 0.58 | 0.84 | 0.97 |
| Height of first outer layer portion (µm) | 40 | 40 | 40 | 40 |
| Height of second outer layer portion (µm) | 90 | 90 | 220 | 90 |
| Side gap (µm) | 50 | 170 | 50 | 50 |
| Number of layers stacked in inner layer portion | 250 | 250 | 360 | 415 |
| Occurrence of cracks | GOOD | GOOD | BAD | BAD |

The Table above indicates the evaluation results of this experiment. As indicated by the Table above, in the capacitors of example 1 and comparative example 1 in which the height of the body was smaller than the width thereof, the occurrence of cracks during the firing of the capacitors was significantly reduced or prevented. However, in the capacitor of comparative example 1, since the height of the inner layer portion is greater than the width thereof, the electrostatic capacitance was lower than that of example 1. Accordingly, only in the capacitor of example 1, the occurrence of cracks caused by an internal stress produced by the difference in the coefficient of thermal contraction between dielectric layers and conductive layers was significantly reduced or prevented while securing a sufficient electrostatic capacitance.

Particularly, a preferred embodiment of the present invention is effectively applicable to small capacitors in which the height of the second outer layer portion $12b_2$ is about 50 μm or greater, the electrostatic capacitance is about 10 μF or higher, the length of the body 11 is about 2.0 mm or smaller, and the number of conductive layers 13 to be stacked is about 250 or greater, for example.

Figure 23:
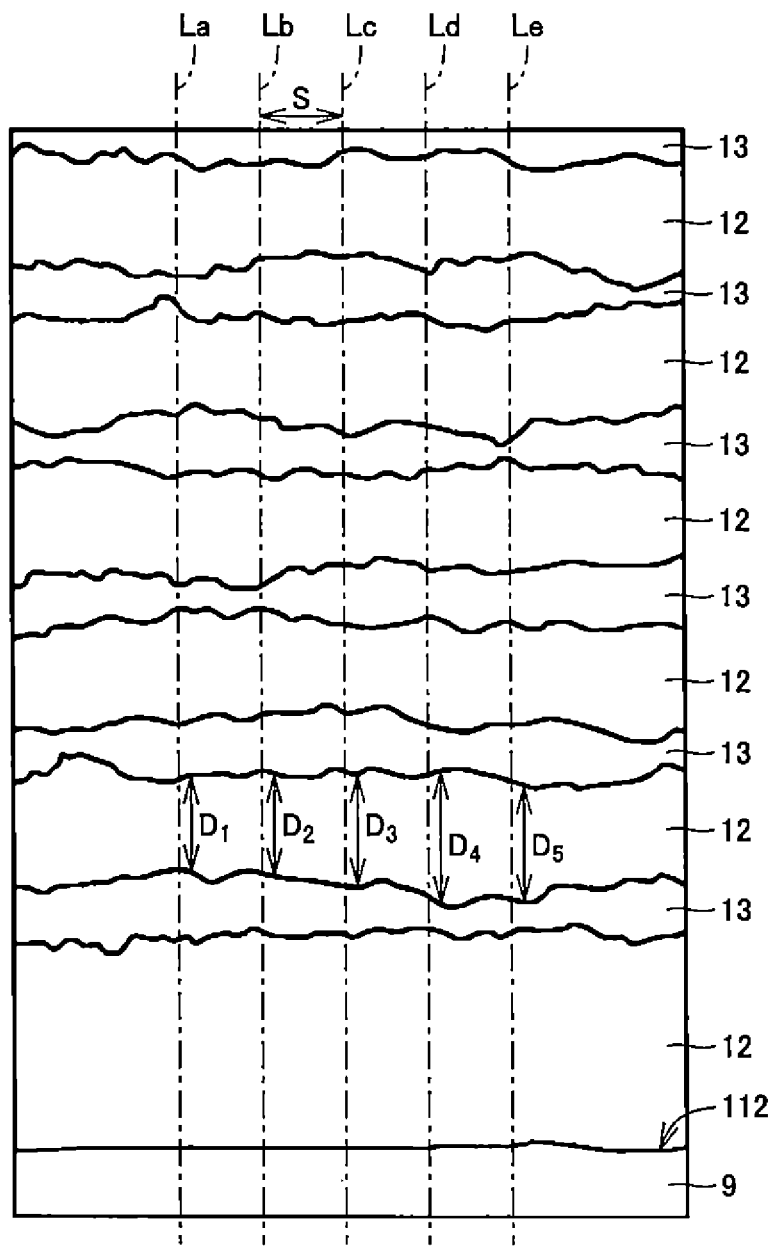
FIG. 23 illustrates an example of an enlarged image of a cross section of a multilayer ceramic capacitor observed with a scanning electron microscope (SEM).

Measurement methods for the thickness of a dielectric layer and that of a conductive layer of a capacitor will be discussed below. FIG. 23 illustrates an example of an enlarged image of a cross section of a capacitor observed with a scanning electron microscope (SEM). In FIG. 23, a portion of the second main surface 112 of the capacitor in contact with an embedding resin 9 is shown.

When measuring the thickness of a dielectric layer and that of a conductive layer of a capacitor, the following method is used. In an enlarged image of a cross section of a capacitor observed with a SEM, as shown in FIG. 23, a straight line Lc extending in the stacking direction of the body of the capacitor and passing through the center of the body is drawn. Then, a plurality of straight lines parallel with the straight line Lc are drawn at equal pitches S. The pitch S may be set to be about five to ten times as long as the thickness of a dielectric layer or that of a conductive layer to be measured. If, for example, a dielectric layer having a thickness of about 1 μm is measured, the pitch S is set to be about 5 μm. The number of lines drawn on one side and that on the other side of the straight line Lc are the same. That is, an odd number of lines including the straight line Lc are drawn. In FIG. 23, an example in which five straight lines La through Le are drawn is shown.

Then, on each of the lines La through Le, the thickness of a dielectric layer and that of a conductive layer are measured. If, on each of the straight lines La through Le, a conductive layer is missing and dielectric layers join each other with the conductive layer therebetween, or if an enlarged image at a portion to be measured is not clear, the thickness or the distance is measured on another straight line separated from the straight line Lc.

When measuring the thickness of a dielectric layer 12, as shown in FIG. 23, the thickness $D_1$ on the straight line La, the thickness $D_2$ on the straight line Lb, the thickness $D_3$ on the straight line Lc, the thickness $D_4$ on the straight line Ld, and the thickness $D_5$ on the straight line Le are measured, and the average value thereof is set to be the thickness of the dielectric layer 12.

When calculating the average thickness of the plurality of dielectric layers 12 included in the inner layer portion 11m, the thicknesses of a total of five dielectric layers 12 constituted by the dielectric layer 12 positioned substantially at the center of the inner layer portion 11m in the height direction T and two dielectric layers 12 positioned at each of both sides of this dielectric layer 12 are measured by using the above-described method, and the average value thereof is set to be the average thickness of the plurality of dielectric layers 12 included in the inner layer portion 11m.

If the number of stacked dielectric layers 12 is less than five, the thicknesses of all the dielectric layers 12 are measured by using the above-described method, and the average value thereof is set to be the average thickness of the dielectric layers 12.

A method for measuring the width of the side gaps 12c is as follows. A WT cross section passing through the center of the body 11 is exposed by polishing the body 11 and is observed with an optical microscope. Then, the side gap 12c having the largest width is measured.

A method for measuring the width $W_1$ of the inner layer portion 11m is as follows. A WT cross section passing through the center of the body 11 is exposed by polishing the body 11 and is observed with an optical microscope. Then, the widths of the conductive layer 13 positioned closest to the first main surface 111, the conductive layer 13 positioned closest to the second main surface 112, and the conductive layer 13 positioned closest to the center of the inner layer portion 11m in the stacking direction are measured, and the average value of the three measured widths is calculated.

A method for measuring the height $T_1$ of the inner layer portion 11m is as follows. A WT cross section passing through the center of the body 11 is exposed by polishing the body 11 and is observed with an optical microscope. Then, the length of a line segment passing through the center of the body 11 and connecting the conductive layer 13 positioned closest to the first main surface 111 and the conductive layer 13 positioned closest to the second main surface 112 with the shortest distance is measured.

A method for measuring the height $h_1$ of the first outer layer portion $12b_1$ or the height $h_2$ of the second outer layer portion $12b_2$ is as follows. A WT cross section passing through the center of the body 11 is exposed by polishing the body 11 and is observed with an optical microscope. Then, the height $h_1$ of the first outer layer portion $12b_1$ or the height $h_2$ of the second outer layer portion $12b_2$ at the center of the body 11 in the width direction W is measured.

Analysis for the composition of components contained in the first dielectric layer 12x or the second dielectric layer 12y may be conducted by using inductively coupled plasma (ICP) emission spectrometry or a WDX. If elemental analysis is conducted by using ICP emission spectrometry, a sample is formed into a powder and is dissolved with an acid. Then, the resulting solution is subjected to ICP emission spectrometry, thus specifying the composition. If elemental analysis is conducted by using a WDX, a WT cross section is exposed by polishing the body of a capacitor embedded in a resin, and then, the composition is specified by using a WDX attached to a SEM.

The boundary region of the outer portion having a high content of Si with the inner portion may be identified as follows. A WT cross section is exposed by polishing the body of a capacitor embedded in a resin, and a backscattered electron image of the exposed WT cross section is captured and observed by using a SEM. Alternatively, the boundary region may be identified by creating element mapping of the exposed WT cross section by using a WDX attached to a SEM and by specifying a portion having a high content of Si.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a body that includes a plurality of dielectric layers and a plurality of conductive layers stacked on each other in a stacking direction and that includes first and second main surfaces opposing each other in the stacking direction, first and second end surfaces opposing each other in a length direction and connecting the first and second main surfaces, and first and second side surfaces opposing each other in a width direction and connecting the first and second main surfaces and the first and second end surfaces; and first and second outer electrodes that are disposed on portions of a surface of the body and oppose each other in the length direction; wherein the body includes a first outer layer portion including a first of the plurality of dielectric layers defining the first main surface, a second outer layer portion including a second of the plurality of dielectric layers defining the second main surface, and an inner layer portion adjacent to both of the first outer layer portion and the second outer layer portion, the inner layer portion includes a portion extending from a first outermost conductive layer positioned closest to the first main surface among the plurality of conductive layers through a second outermost conductive layer positioned closest to the second main surface among the plurality of conductive layers in the stacking direction;

a dimension of the body in the width direction is at least 20% greater than a dimension of the body in the stacking direction;

the dimension of the body in the width direction is smaller than a dimension of the body in the length direction;

the second outer layer portion includes an outer portion including the second main surface and an inner portion adjacent to both of the outer portion and the inner layer portion;

each of the inner portion and the outer portion includes Si as a secondary component;

a molar ratio of the Si included in the outer portion is higher than a molar ratio of the Si included in the inner portion;

a dimension of the second outer layer portion in the stacking direction is greater than a dimension of the first outer layer portion in the stacking direction;

a total dimension of the first outer layer portion and the second outer layer portion in the stacking direction is smaller than a dimension of the inner layer portion in the stacking direction;

a color of the second main surface is different from a color of the first main surface; and a composition of a dielectric material of the plurality of dielectric layers included in the inner layer portion is the same as a composition of a dielectric material of the first plurality of dielectric layers included in the first outer layer portion.

2. The multilayer ceramic capacitor according to claim 1, wherein the dimension of the inner layer portion in the stacking direction is smaller than a dimension of a portion of the inner layer portion where the plurality of conductive layers are stacked in the width direction.

3. The multilayer ceramic capacitor according to claim 1, wherein the body includes side gaps between each of the first and second side surfaces and the inner layer portion, and a maximum dimension or an average dimension of the side gaps in the width direction is greater than about 30 μm and less than about 90 μm.

4. The multilayer ceramic capacitor according to claim 1, wherein the outer portion includes a boundary region adjacent to the inner portion, and, when viewed from the width direction, the boundary region includes a portion that inclines toward the first main surface as the boundary region gets closer to one of the first and second end surfaces.

5. The multilayer ceramic capacitor according to claim 1, wherein the dimension of the body in the width direction is greater than about 0.9 mm and the dimension of the body in the stacking direction is smaller than about 0.9 mm.

6. The multilayer ceramic capacitor according to claim 1, wherein the dimension of the second outer layer portion in the stacking direction is about 90 μm or greater and is equal to or smaller than about ¼ of the dimension of the inner layer portion in the stacking direction.

7. The multilayer ceramic capacitor according to claim 1, wherein the body includes side gaps between each of the first and second side surfaces and the inner layer portion, and an average dimension of the side gaps in the width direction is greater than the dimension of the first outer layer portion in the stacking direction.

8. The multilayer ceramic capacitor according to claim 1, wherein the dimension of the first outer layer portion in the stacking direction is about 10 μm or greater, and the dimension of the second outer layer portion in the stacking direction is about 90 μm or greater.

9. A multilayer ceramic capacitor mount body comprising:

the multilayer ceramic capacitor according to claim 1; and a substrate on which the multilayer ceramic capacitor is mounted; wherein the second main surface of the multilayer ceramic capacitor faces the substrate.

10. The multilayer ceramic capacitor mount body according to claim 9, wherein the substrate includes two lands on a surface of the substrate, the two lands being electrically connected to the first and second outer electrodes of the multilayer ceramic capacitor, respectively; and a dimension of each of the two lands in the width direction of the body is smaller than the dimension of the body in the width direction.

11. The multilayer ceramic capacitor mount body according to claim 10, wherein, the width of each of the two lands in the width direction is smaller than the dimension of the inner layer portion in the width direction.

12. A multilayer ceramic capacitor comprising:

a body that includes a plurality of dielectric layers and a plurality of conductive layers stacked on each other in a stacking direction and that includes first and second main surfaces opposing each other in the stacking direction, first and second end surfaces opposing each other in a length direction and connecting the first and second main surfaces, and first and second side surfaces opposing each other in a width direction and connecting the first and second main surfaces and the first and second end surfaces; and first and second outer electrodes that are disposed on portions of a surface of the body and oppose each other in the length direction; wherein the body includes a first outer layer portion including a first of the plurality of dielectric layers defining the first main surface, a second outer layer portion including a second of the plurality of dielectric layers defining the second main surface, and an inner layer portion adjacent to both of the first outer layer portion and the second outer layer portion, the inner layer portion includes a portion extending from a first outermost conductive layer positioned closest to the first main surface among the plurality of conductive layers through a second outermost conductive layer positioned closest to the second main surface among the plurality of conductive layers in the stacking direction;

a dimension of the body in the width direction is at least 20% greater than a dimension of the body in the stacking direction;

the dimension of the body in the width direction is smaller than a dimension of the body in the length direction;

the second outer layer portion includes an outer portion including the second main surface and an inner portion adjacent to both of the outer portion and the inner layer portion;

each of the inner portion and the outer portion includes Si as a secondary component;

a molar ratio of the Si included in the outer portion is higher than a molar ratio of the Si included in the inner portion;

a dimension of the second outer layer portion in the stacking direction is greater than a dimension of the first outer layer portion in the stacking direction;

a total dimension of the first outer layer portion and the second outer layer portion in the stacking direction is smaller than a dimension of the inner layer portion in the stacking direction;

a dimension of the outer portion in the stacking direction is about 30 µm or greater;

a dimension of the inner portion in the stacking direction is about 20 µm or greater;

a difference between the dimension of the second outer layer portion in the stacking direction and the dimension of the first outer layer portion in the stacking direction is about 10 µm or greater;

the body includes side gaps between each of the first and second side surfaces and the inner layer portion;

a maximum dimension or an average dimension of the side gaps in the width direction is greater than about 30 µm and less than about 90 µm;

the average dimension of the side gaps in the width direction is greater than the dimension of the first outer layer portion in the stacking direction;

a color of the second main surface is different from a color of the first main surface; and a composition of a dielectric material of the plurality of dielectric layers included in the inner layer portion is the same as a composition of a dielectric material of the first plurality of dielectric layers included in the first outer layer portion.

13. A multilayer ceramic capacitor mount body comprising:

the multilayer ceramic capacitor according to claim 12; and a substrate on which the multilayer ceramic capacitor is mounted; wherein the second main surface of the multilayer ceramic capacitor faces the substrate.

14. The multilayer ceramic capacitor mount body according to claim 13, wherein the substrate includes two lands on a surface of the substrate, the two lands being electrically connected to the first and second outer electrodes of the multilayer ceramic capacitor, respectively; and a dimension of each of the two lands in the width direction of the body is smaller than the dimension of the body in the width direction.

15. The multilayer ceramic capacitor mount body according to claim 14, wherein, the width of each of the two lands in the width direction is smaller than the dimension of the inner layer portion in the width direction.

* * * * *